United States Patent
Miyauchi et al.

(10) Patent No.: US 11,805,323 B2
(45) Date of Patent: Oct. 31, 2023

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventors: Ken Miyauchi, Tokyo (JP); Kazuya Mori, Tokyo (JP); Sangman Han, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/710,901

(22) Filed: Mar. 31, 2022

(65) Prior Publication Data

US 2022/0321759 A1     Oct. 6, 2022

(30) Foreign Application Priority Data

Apr. 1, 2021 (JP) .................. 2021-062701
Mar. 29, 2022 (JP) .................. 2022-053054

(51) Int. Cl.
*H04N 23/73* (2023.01)
*H04N 23/741* (2023.01)
(Continued)

(52) U.S. Cl.
CPC ........... *H04N 23/73* (2023.01); *H04N 23/741* (2023.01); *H04N 23/76* (2023.01); *H04N 23/84* (2023.01)

(58) Field of Classification Search
CPC ...... H04N 23/73; H04N 23/741; H04N 23/76; H04N 23/84
See application file for complete search history.

(56) References Cited

U.S. PATENT DOCUMENTS 8,035,711 B2 * 10/2011 Liu ...................... H04N 25/134
348/277
9,467,633 B2 * 10/2016 Johnson ............... H04N 25/702
(Continued)

FOREIGN PATENT DOCUMENTS

| JP | 2000-165754 A | 6/2000 |
| JP | 4392492 B2 | 1/2010 |
| JP | 5661912 B2 | 3/2011 |

*Primary Examiner* — Ahmed A Berhan
(74) *Attorney, Agent, or Firm* — PILLSBURY WINTHROP SHAW PITTMAN LLP

(57) ABSTRACT

A solid-state imaging device, a method for driving the same, and an electronic apparatus can achieve a high dynamic range based on multiple exposure technique, where images captured with different exposure durations are combined, with it being possible to prevent motion artifacts and LED flickers. A pixel has a 4:0 configuration. The pixel is divided into, for example, four sub-pixels all of which have the same color (for example, G (green)). An access control part sets different charge integration periods and different charge storage starting times between photoelectric conversion parts PD of the sub-pixels and controls the charge integration periods such that they overlap each other. In other words, the access control part sets different charge integration periods and different charge storage starting times, the number of which corresponds to the number of sub-pixels having the same color, and controls the charge integration periods such that they overlap each other.

20 Claims, 22 Drawing Sheets

(51) Int. Cl.
*H04N 23/76* (2023.01)
*H04N 23/84* (2023.01)

(56) References Cited

U.S. PATENT DOCUMENTS

2007/0103569 A1   5/2007   Kawahito
2010/0013969 A1   1/2010   Ui
2013/0313411 A1   11/2013  Ui
2017/0150082 A1   5/2017   Ui
2020/0059622 A1   2/2020   Ui

* cited by examiner

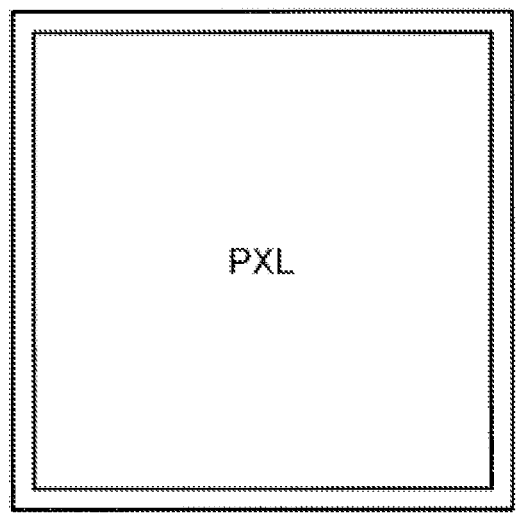
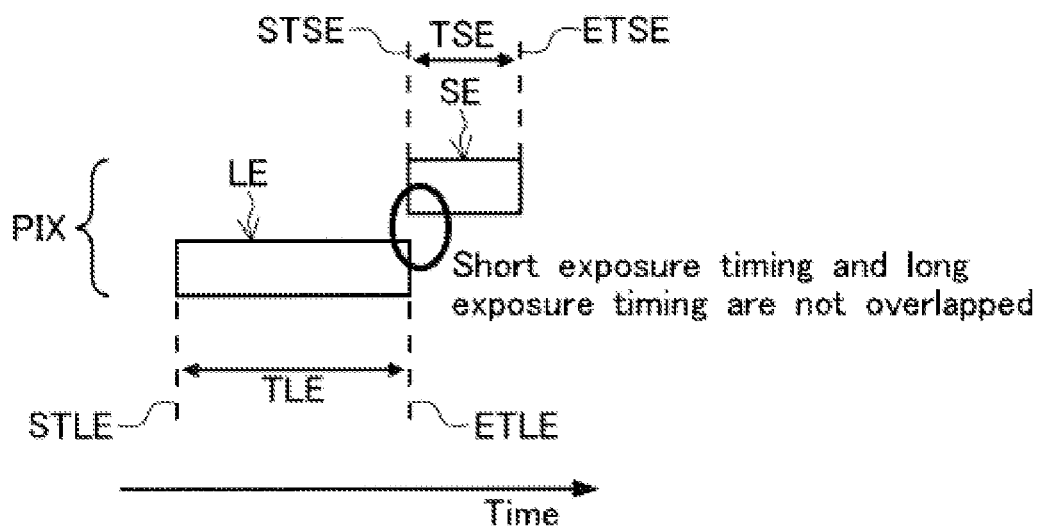
Fig. 1
PRIOR ART

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial Nos. 2021-062701 (filed on Apr. 1, 2021) and 2022-053054 (filed on Mar. 29, 2022), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), automotive cameras, mobile phones and other portable terminals (mobile devices).

The CMOS image sensors include, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

Each pixel of a CMOS image sensor generally includes, for one photodiode for example, four active elements: a transfer transistor serving as a transfer element, a reset transistor serving as a reset element, a source follower transistor serving as a source follower element (an amplification element), and a selection transistor serving as a selection element.

To improve characteristics, various methods have been proposed for fabricating a CMOS image sensor that has a high dynamic range (HDR) and provides a high picture quality (see, for example, Japanese Patent Application Publication No. 2000-165754 ("the '754 Publication") and Japanese Patent No. 4392492 ("the '492 patent")).

The '754 Publication discloses a dynamic range widening technology that involves partitioning (dividing) the exposure period into two or more exposure sessions of different durations, including short-exposure imaging for high illuminance and long-exposure imaging for low illuminance.

The '492 patent describes a technique for increasing the dynamic range by employing multiple exposure techniques, according to which images taken with different exposure durations are combined.

FIG. 1 shows an example of a single pixel and an example of a multiple exposure sequence where long and short exposure periods are set for a single pixel.

In the multiple exposure sequence, long exposure LE first starts at the beginning STLE of a long exposure period TLE, the long exposure period TLE elapses, and the long exposure LE ends at the end ETLE of the long exposure period TLE. Concurrently with the end of the long exposure LE, short exposure SE starts at the beginning STSE of a short exposure period TSE, the short exposure period TSE elapses, and the short exposure SE ends at the end ETSE of the short exposure period TSE.

Japanese Patent No. 4661912 proposes a method of achieving a high dynamic range based on a technique of dividing each pixel into a plurality of, for example, four sub-pixels differing in terms of photosensitivity or possible capacity for electric charges. According to the method, the four sub-pixels are collectively treated as a single pixel but have different storage durations. When this technique is employed, the read-out signals from the four sub-pixels are added together.

FIG. 2 shows an example of a multiple exposure sequence where a very long exposure period TVLE, a long exposure period TLE, a middle exposure period TME, and a short exposure period TSE are defined.

In this multiple exposure sequence, very long exposure VLE first starts at the beginning STVLE of the very long exposure period TVLE, the very long exposure period TVLE elapses, and the very long exposure VLE ends at the end ETVLE of the very long exposure period TVLE. Concurrently with the end of the very long exposure VLE, long exposure LE starts at the beginning STLE of the long exposure period TLE, the long exposure period TLE elapses, and the long exposure LE ends at the end ETLE of the long exposure period TLE. Concurrently with the end of the long exposure LE, middle exposure ME starts at the beginning STME of the middle exposure period TME, the middle exposure period TME elapses, and the middle exposure ME ends at the end ETME of the middle exposure period TME. Concurrently with the end of the middle exposure ME, short exposure SE starts at the beginning STSE of the short exposure period TSE, the short exposure period TSE elapses, and the short exposure SE ends at the end ETSE of the short exposure period TSE.

The conventional multiple exposure technique described above, however, disadvantageously experiences problems such as so-called motion artifacts or flickers if objects move or change during the exposure period, as shown in FIG. 3.

Specifically, if a subject (object) moves during the long or short exposure period, combining the images may result in misalignment (motion artifacts). This is because the subject can move faster than the shutter speed (exposure duration), and the motion artifacts appear in the captured image in the form of the blurred subject (out of focus).

Furthermore, the long and short exposure periods, which are successive, do not overlap at all. If the object is an LED, for example, there may be a case where two pulses can be detected during the long exposure period, but no pulses are detected during the short exposure period due to flickering specific to LEDs.

In recent years, LEDs have been increasingly used in traffic signs and signals, vehicle headlamps and brake lamps and the like. When LEDs are captured by image sensors, however, the images characteristically include flickers (LED flickers) due to the relationship between the light emission from the LEDs (the driving frequency) and the shutter timings of the image sensors. If the flashing of the LEDs affects the resulting images, the images can not tell whether they show flashing lamps of emergency vehicles or LED flickers, or contribute to misidentifying traffic signs, for example.

The LED flickers can be prevented if the exposure duration is extended to make sure that the LEDs emit light at least once during the exposure period and the LEDs actually emit light within the exposure period. If the exposure duration is extended, however, the LED flickers can be reduced but the images may disadvantageously include halation. This means more difficulties in achieving high dynamic range (HDR). In other words, there is a trade-off between LED flickers and high dynamic range (HDR). In addition to these disadvantages, the subjects are more likely to be blurred if the exposure duration is extended.

SUMMARY

One object of the present invention is to provide a solid-state imaging device, a method for driving a solid-state imaging device, and an electronic apparatus that are capable of achieving a high dynamic range based on the multiple exposure technique, where images resulting from different exposure durations are combined, with it being possible to prevent motion artifacts and LED flickers.

A first aspect of the present invention provides a solid-state imaging device including a pixel part having pixels arranged therein, where each pixel is divided into a plurality of sub-pixels including sub-pixels of a same color, and each pixel includes a photoelectric conversion part for performing photoelectric conversion, and an access control part for individually controlling accesses to the plurality of sub-pixels of the each pixel. The access control part sets different charge integration periods and different charge storage starting times between the photoelectric conversion parts of the plurality of sub-pixels, and performs exposure control such that the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

A second aspect of the present invention provides a method for driving a solid-state imaging device including a pixel part having pixels arranged therein, where each pixel is divided into a plurality of sub-pixels including sub-pixels of a same color, each pixel includes a photoelectric conversion part for performing photoelectric conversion, and the solid-state imaging device is configured to individually control accesses to the plurality of sub-pixels of the each pixel. According to the method, different charge integration periods and different charge storage starting times are set between the photoelectric conversion parts of the plurality of sub-pixels, and the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

A third aspect of the present invention provides an electronic apparatus including a solid-state imaging device, and an optical system for forming a subject image on the solid-state imaging device. The solid-state imaging device includes a pixel part having pixels arranged therein, where each pixel is divided into a plurality of sub-pixels including sub-pixels of a same color, and each pixel includes a photoelectric conversion part for performing photoelectric conversion, and an access control part for individually controlling accesses to the plurality of sub-pixels of the each pixel. The access control part sets different charge integration periods and different charge storage starting times between the photoelectric conversion parts of the plurality of sub-pixels, and performs exposure control such that the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

Advantageous Effects

The present invention is capable of achieving a high dynamic range based on multiple exposure technique, where images captured with different exposure durations are combined, with it being possible to prevent motion artifacts and LED flickers.

BRIEF DESCRIPTION OF THE DRAWINGS

FIG. 1 shows an example of a single pixel and an example of a multiple exposure sequence where long and short exposure periods are set for a single pixel.

DESCRIPTION OF THE PREFERRED EMBODIMENTS

Embodiments of the present invention will be hereinafter described with reference to the drawings.

First Embodiment

Figure 2:
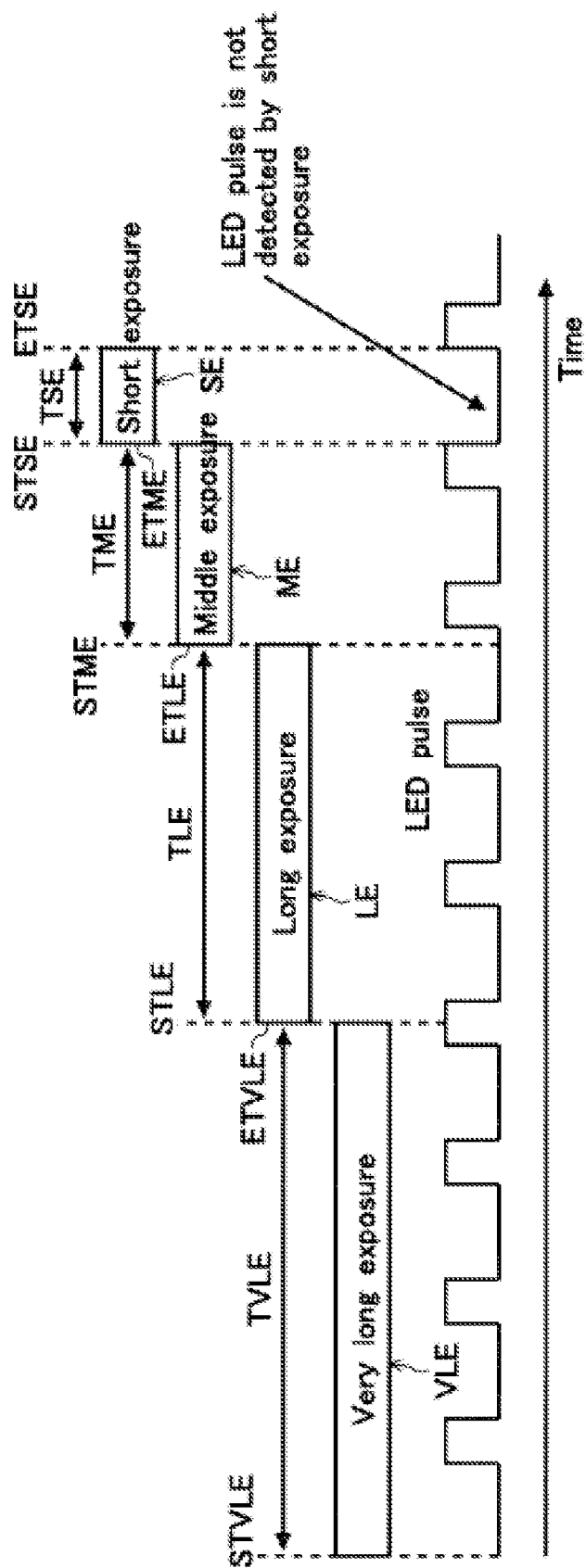
FIG. 2 shows an example of a multiple exposure sequence where a very long exposure period, a long exposure period, a middle exposure period, and a short exposure period are defined.
Figure 3:
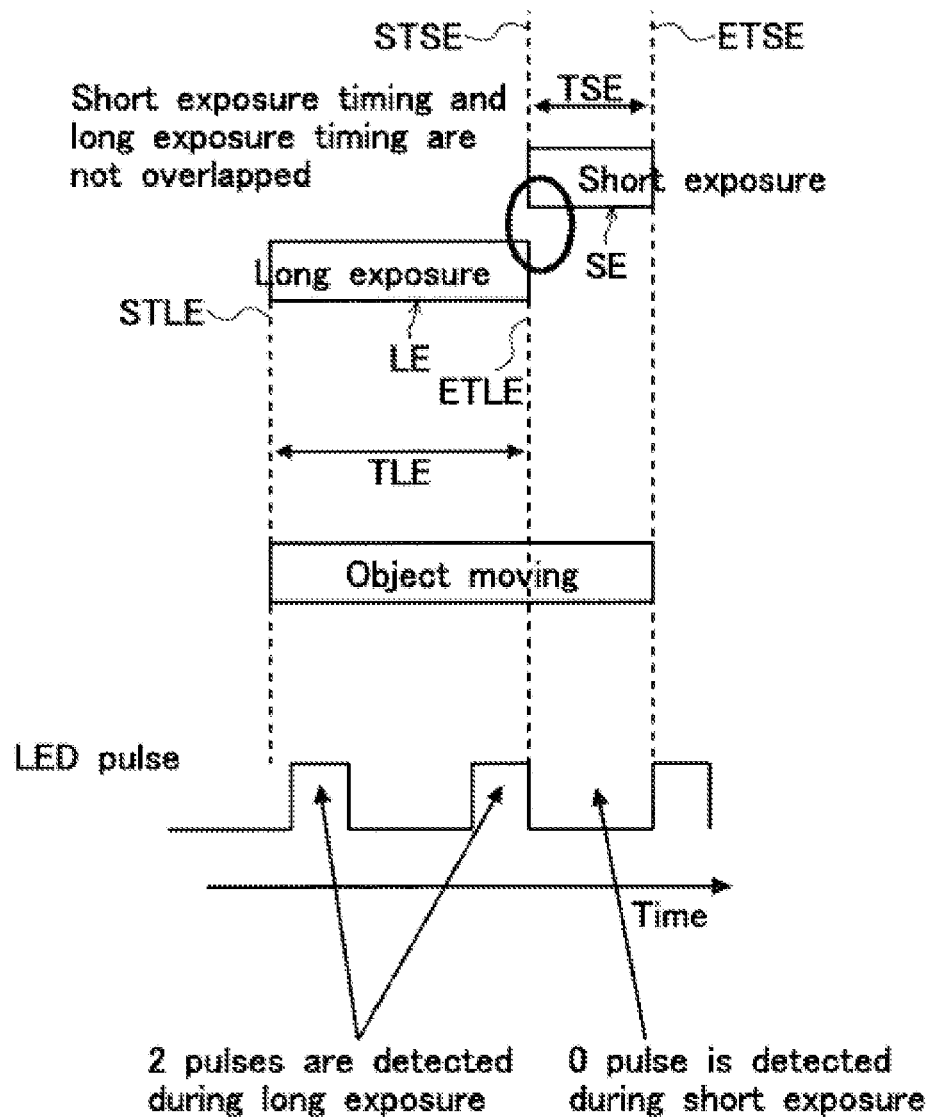
FIG. 3 is used to explain problems of a conventional multiple exposure technique.
Figure 4:
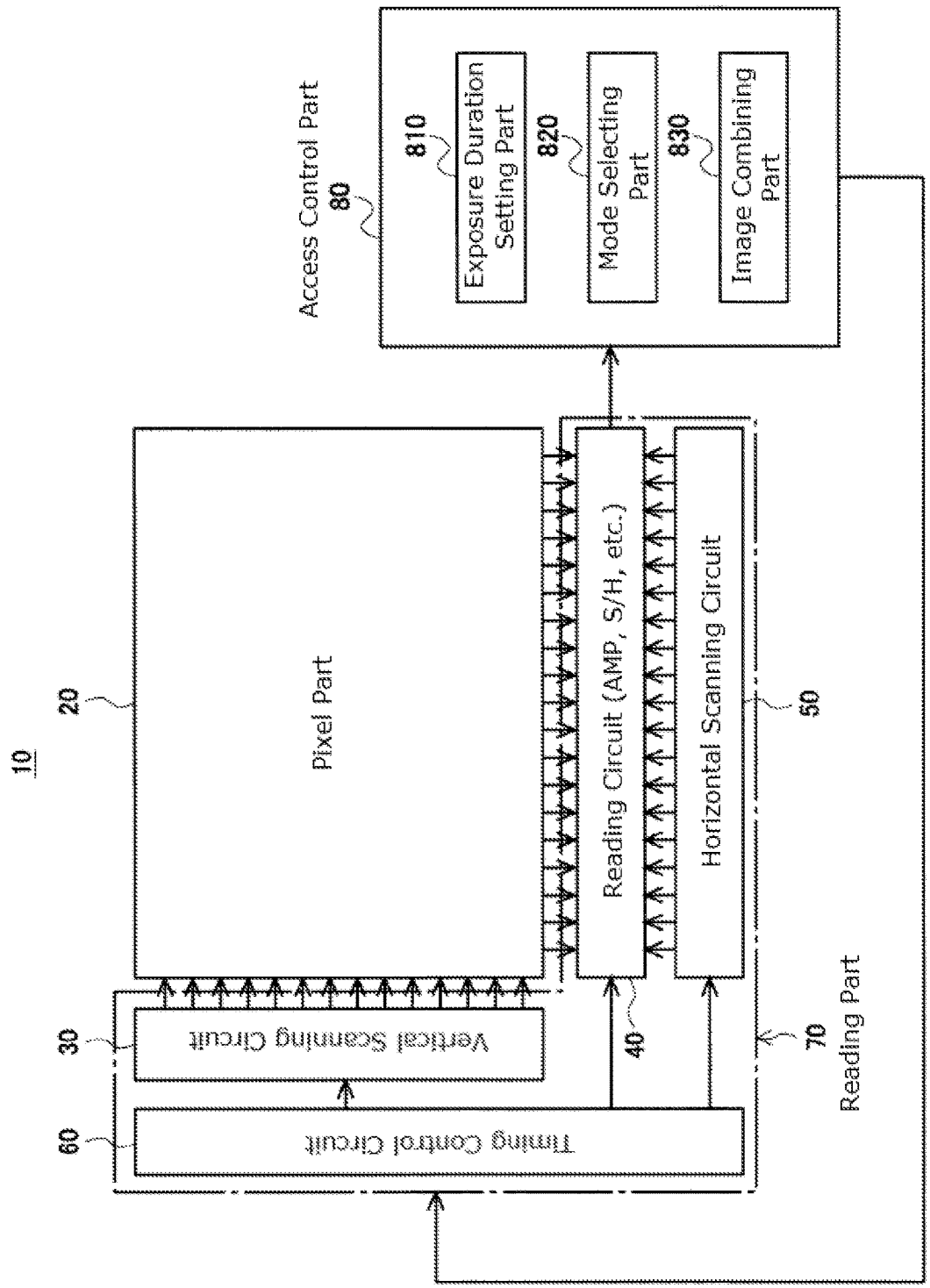
FIG. 4 is a block diagram showing an example configuration of a solid-state imaging device according to a first embodiment of the present invention.

FIG. 4 is a block diagram showing an example configuration of a solid-state imaging device relating to a first embodiment of the present invention. In this embodiment, a solid-state imaging device 10 is constituted by, for example, a CMOS image sensor.

As shown in FIG. 4, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, a timing control circuit 60, a reading part 70, and an access control part 80. Among these components, for example, the vertical scanning circuit 30, the reading circuit 40, the horizontal scanning circuit 50, and the timing control circuit 60 constitute part of the reading part 70 and the access control part 80 for reading pixel signals.

In the solid-state imaging device 10 relating to the first embodiment, as will be described in detail below, pixels PXL20 are arranged in a matrix pattern in the pixel part 20, and each pixel PXL20 is divided into a plurality of (four, in the first embodiment) sub-pixels SPXL of the same color (for example, green (G)). In the first embodiment, each sub-pixel includes a photoelectric conversion part (PD) and a transfer transistor serving as a transfer element, as will be described below. The solid-state imaging device 10 is configured to be capable of performing a multiple exposure mode operation, where the access control part 80 individually controls the accesses to the sub-pixels of the pixel PXL20 and images captured with different exposure durations are combined together.

In the solid-state imaging device 10, the access control part 80 performs the following exposure control during the multiple exposure operation where images captured with different exposure durations are combined, so that the solid-state imaging device 10 can achieve high dynamic range while preventing motion artifacts or LED flickers.

The access control part 80 sets different charge integration periods TE and charge storage starting times STE between the photoelectric conversion parts (photodiodes) PD of the sub-pixels SPXL. When the pixel PXL20 is divided into four sub-pixels SPXL_0 to SPXL_3, the access control part 80 assigns a very long exposure period TVLE, a long exposure period TLE, a middle exposure period TME and a short exposure period TSE to the respective charge integration periods TE of the photoelectric conversion parts (photodiodes) PD of the sub-pixels SPXL_0 to SPXL_3. The access control part 80 further determines the starting time STVLE of the very long exposure period TVLE, the starting time STLE of the long exposure period TLE, the starting time STME of the middle exposure period TME, and the starting time STSE of the short exposure period TSE. Under these settings, the access control part 80 performs exposure control. The photoelectric conversion parts (photodiodes) of the sub-pixels sequentially start storing charges, starting from the photoelectric conversion part (photodiode) of the sub-pixel with the longest charge integration period, and the charge integration period of the photoelectric conversion part (photodiode) of any of the sub-pixels overlaps a charge integration period of the photoelectric conversion part (photodiode) of a preceding sub-pixel.

The access control part 80 performs the exposure control such that the charge integration periods of the sub-pixels of the same color all end before the end of the longest charge integration period. Alternatively, the access control part 80 may perform the exposure control such that the charge integration periods of the sub-pixels of the same color may end concurrently.

According to the first embodiment, in the pixel PXL20, at least two (in the present embodiment, four) photoelectric conversion parts (photodiodes) and transfer elements (transfer transistors), making up the sub-pixels SPXL, share one floating diffusion (FD) serving as an output node and one source follower element (source follower transistor) constituting an output buffer.

Furthermore, the pixel reading part according to the present embodiment can change the capacitance of the floating diffusion FD10 between a first capacitance and a second capacitance, so that the conversion gain can be changed between a first conversion gain corresponding to the first capacitance (for example, high gain conversion: HCG) and a second conversion gain corresponding to the second capacitance (for example, low gain conversion: LCG). Here, the conversion is performed with the conversion gain to produce a voltage signal, and the voltage signal is amplified and then output to an internal signal line. In this manner, the pixel reading part is configured to be capable of performing a dual conversion gain reading operation.

The solid-state imaging device 10 may be configured to be capable of operating in a global shutter mode. The global shutter can include, for example, a voltage-holding global shutter achieved by twice as many sample (S)/hold (H) capacitors as the sub-pixels, and a digital-pixel global shutter achieved by an analog-to-digital (AD) converter and the same number of digital memories as the sub-pixels. In the present embodiment, the AD converter can be an AD converter with a reset function for comparing a readout signal voltage read out from the sub-pixels with a reference voltage and using the result of the comparison as a read-out result.

The following outlines the configurations and functions of the parts of the solid-state imaging device 10, in particular, the configuration and function of the pixel PXL20 of the pixel part 20 relating to the multiple exposure operation and the relating multiple exposure operation.

(Configurations of Pixel PXL20 of Pixel Part 20 and Sub-Pixels Forming Pixel PXL20)

Figure 5:
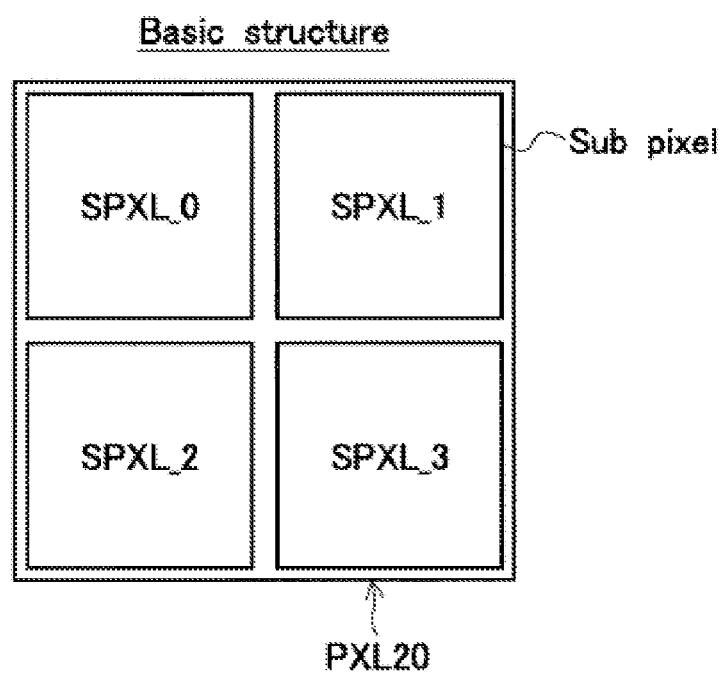
FIG. 5 schematically shows an example of a pixel formed by four sub-pixels in the solid-state imaging device relating to the first embodiment of the present invention.
Figure 6A:
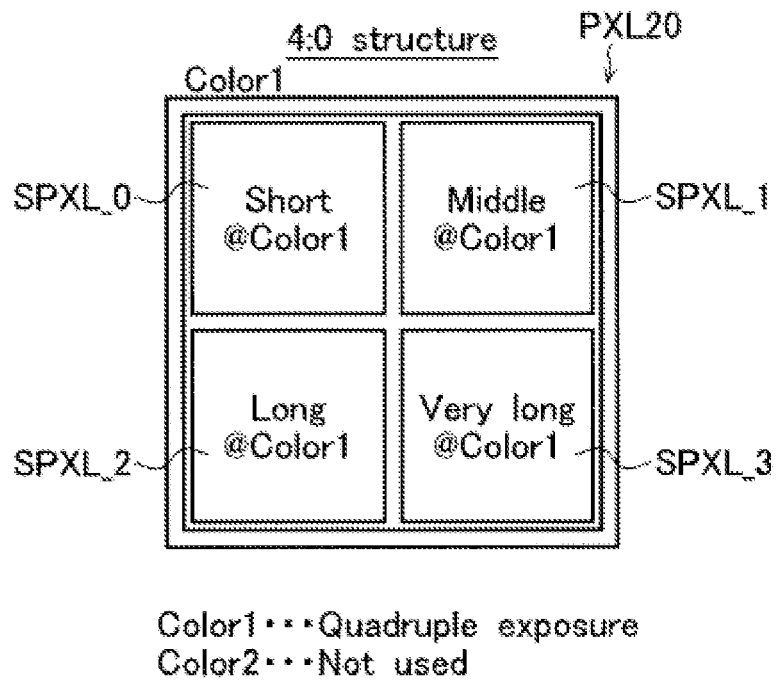
FIGS. 6A and 6B are used to illustrate colors, charge integration periods and other characteristics assigned to the four sub-pixels of a single pixel of the solid-state imaging device relating to the first embodiment of the present invention.
Figure 6B:
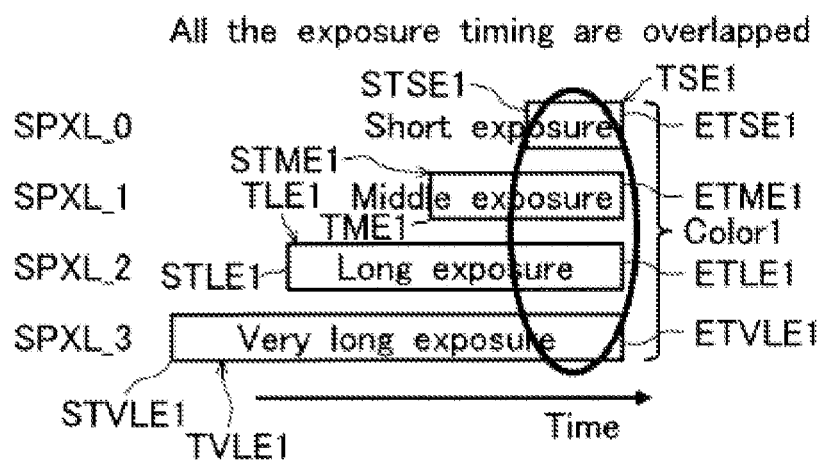
Figure 7:
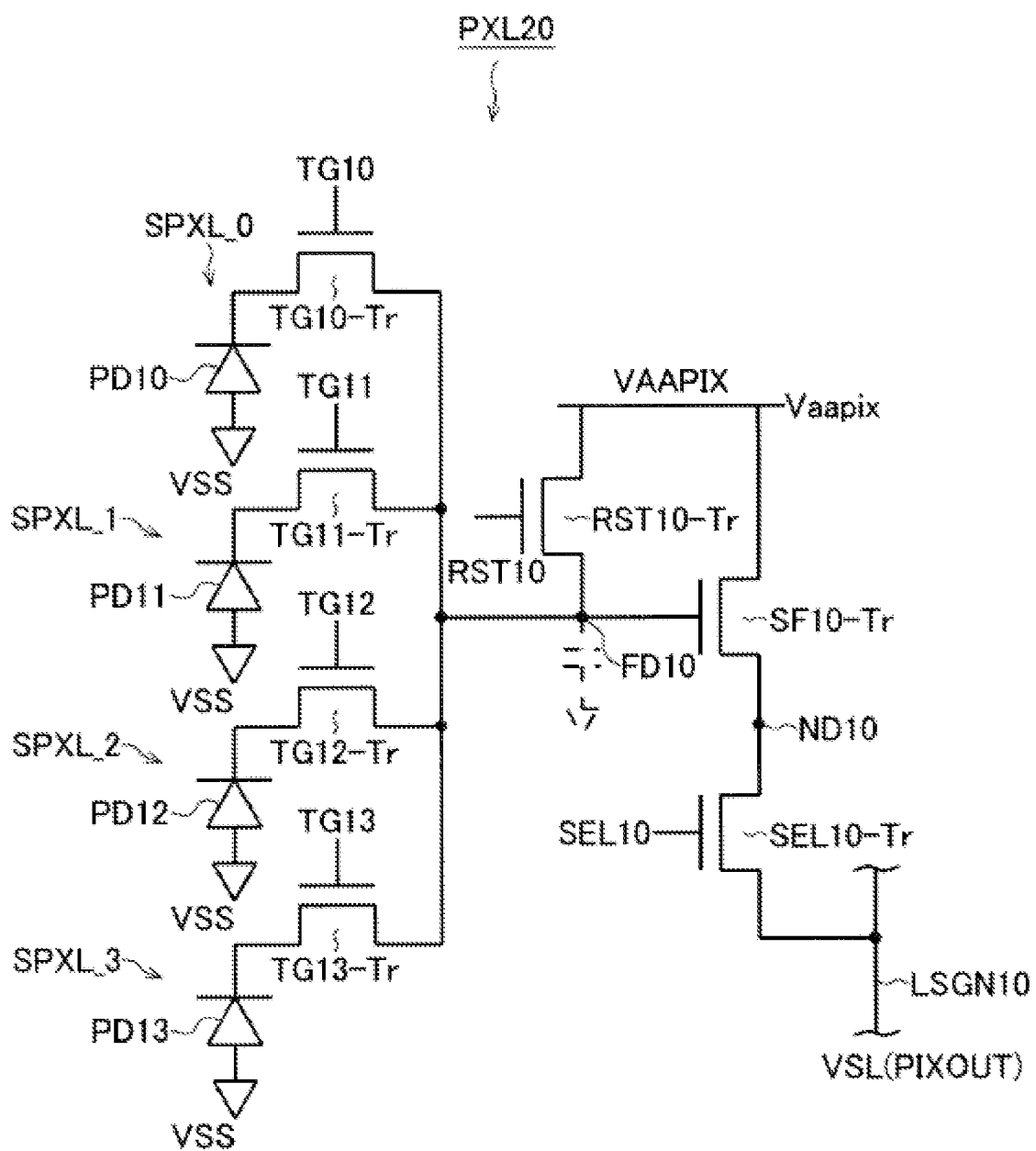
FIG. 7 is a circuit diagram showing an example of the pixel formed by the four sub-pixels in the solid-state imaging device relating to the first embodiment of the present invention.

FIG. 5 schematically shows an example of a pixel formed by four sub-pixels in the solid-state imaging device relating to the first embodiment of the present invention. FIGS. 6A and 6B are used to illustrate colors, charge integration periods and other characteristics assigned to the four sub-pixels of a single pixel of the solid-state imaging device relating to the first embodiment of the present invention. FIG. 6A shows an example of 4:0 configuration of the pixel of the solid-state imaging device relating to the first embodiment, where the four sub-pixels all have the same color or a first color Color 1. FIG. 6B schematically shows an example of a multiple exposure sequence for the 4:0 configuration. FIG. 7 is a circuit diagram showing an example of the pixel of the solid-state imaging device relating to the first embodiment of the present invention, which is formed by the four sub-pixels.

In the first embodiment, the pixel PXL20 is divided into four sub-pixels of the same color or a first color (for example, G (green)) Color 1: sub-pixels SPXL_0, SPXL_1, SPXL_2, and SPXL_3. The sub-pixels SPXL_0, SPXL_1, SPXL_2, and SPXL_3 are arranged in a square geometry having two rows and two columns. In the first embodiment, each of the sub-pixels (SPXL_0, SPXL_1, SPXL_2, and SPXL_3) includes a photodiode (PD10 to PD13) serving as a photoelectric conversion part and a transfer transistor (TG10-Tr to TG13-Tr) serving as a transfer element, as shown in FIG. 7. The solid-state imaging device 10 is configured to be capable of performing a multiple exposure mode operation, where the access control part 80 individually controls the accesses to the sub-pixels SPXL_0, SPXL_1, SPXL_2, and SPXL_3 of the pixel PXL20 and the images captured with different exposure durations are combined.

In the first embodiment, since the four sub-pixels SPXL_0, SPXL_1, SPXL_2, and SPXL_3 forming the pixel PXL20 have the same color or the first color Color1, the access control part 80 sets four different charge integration periods TE and four different charge storage starting times STE for the four photodiodes PD10 to PD13 in the pixel PXL20, where the number "4" is equal to the number of sub-pixels. When the pixel PXL20 is divided into the four sub-pixels SPXL_0 to SPXL_3 of the same color, a short exposure period TSE1 is assigned as the charge integration period TE of the photodiode PD10, a middle exposure period TME1 is assigned as the charge integration period TE of the photodiode PD11, a long exposure period TLE1 is assigned as the charge integration period TE of the photodiode PD12, and a very long exposure period TVLE1 is assigned as the charge integration period TE of the photodiode PD13, in order to realize quadruple exposure for the sub-pixels SPXL_0 to SPXL_3. The access control part 80 further determines, for the pixel PXL20, the starting time STVLE1 of the very long exposure period TVLE1, the starting time STLE1 of the long exposure period TLE1, the starting time STME1 of the middle exposure period TME1, and the starting time STSE1 of the short exposure period TSE1.

Under these settings, the access control part 80 performs exposure control on the pixel PXL20. The photodiode PD13 of the sub-pixel SPXL_3 with the longest charge integration period is first controlled to start storing charges, and the other photodiodes sequentially start storing charges (PD13→PD12→PD11→PD10). The charge integration period of the photodiode of any of the sub-pixels overlaps the charge integration period of the photodiode of the preceding sub-pixel. In the first embodiment, four charge integration periods are set. When three or more charge integration periods are set, all of them are basically controlled to overlap each other.

The access control part 80 performs exposure control on the pixel PXL20 such that the charge storing periods of the sub-pixels of the same color all end before the end of the longest charge integration period (in the present example, the very long exposure period TVLE1). In the pixel PXL20 of the first embodiment, as shown in FIG. 6B, the access control part 80 can perform the exposure control such that the charge integration periods of the sub-pixels of the same color end concurrently.

<Example Circuit Configurations of Pixel PXL20>

The pixel PXL20 shown in FIG. 7 includes, for example, a first photodiode PD10, which is a first photoelectric conversion element, a second photodiode PD11, which is a second photoelectric conversion element, a third photodiode PD12, which is a third photoelectric conversion element, and a fourth photodiode PD13, which is a fourth photoelectric conversion element. In the pixel PXL20, the first, second, third and fourth photodiodes PD10, PD11, PD12 and PD13 share a floating diffusion FD 10, which serves as an output node ND10.

The first, second, third and fourth photodiodes PD10, PD11, PD12 and PD13 perform photoelectric conversion to generate charges and store the generated charges in the respective integration periods, which are set by the access control part 80. A first transfer transistor TG10-Tr is connected between the storage part of the first photodiode PD10 and the floating diffusion FD10. A second transfer transistor TG11-Tr is connected between the storage part of the second photodiode PD11 and the floating diffusion FD10. A third transfer transistor TG12-Tr is connected between the storage part of the third photodiode PD12 and the floating diffusion FD10. A fourth transfer transistor TG13-Tr is connected between the storage part of the fourth photodiode PD13 and the floating diffusion FD10.

The first photodiode PD10 and the first transfer transistor TG10-Tr constitute the sub-pixel SPXL_0, the second photodiode PD11 and the second transfer transistor TG11-Tr constitute the sub-pixel SPXL_1, the third photodiode PD12 and the third transfer transistor TG12-Tr constitute the sub-pixel SPXL_2, and the fourth photodiode PD13 and the fourth transfer transistor TG13-Tr constitute the sub-pixel SPXL_3.

The pixel PXL20 includes, for one floating diffusion FD10 serving as the output node ND10, one reset transistor RST10-Tr serving as a reset element, one source follower transistor SF10-Tr serving as a source follower element, and one selection transistor SEL10-Tr serving as a selecting element.

The first, second, third and fourth photodiodes PD10, PD11, PD12 and PD13 generate signal charges (electrons) in an amount determined by the amount of the incident light and stores the same. Description will be hereinafter given of a case where the signal charges are electrons and each transistor is an n-type transistor. However, it is also possible that the signal charges are holes or each transistor is a p-type transistor.

The photodiodes (PDs) in each pixel PXL20 are pinned fully depleted photodiodes (PPDs). On a substrate surface for forming the photodiodes (PDs), there is a surface level due to dangling bonds or other defects, and therefore, a lot of charges (dark current) are generated due to heat energy, so that signals fail to be read out correctly. In the case of a pinned fully depleted photodiode (PPD), a charge storage part of the photodiode (PD) is buried in the substrate to reduce mixing of the dark current into signals.

The first transfer transistor TG10-Tr of the pixel PXL20 is connected between the first photodiode PD10 and the floating diffusion FD10 and controlled by a control signal TG10 applied to the gate thereof through a control line. The first transfer transistor TG10-Tr remains selected and in the conduction state during a transfer period PT in which the control signal TG10 is at the high (H) level, to transfer to the floating diffusion FD10 the charges (electrons) produced by the photoelectric conversion and then stored in the first photodiode PD10. After the first photodiode PD10 and the floating diffusion FD10 are reset to a predetermined reset potential, the first transfer transistor TG10-Tr enters the non-conduction state with the control signal TG10 being set to the low (L) level and the first photodiode PD10 enters a storing period PI. Under these circumstances, if the intensity of the incident light is very high (the amount of the incident light is very large), the charges above the well capacity overflow into the floating diffusion FD10 as overflow charges through the overflow path under the first transfer transistor TG10-Tr.

The second transfer transistor TG11-Tr of the pixel PXL20 is connected between the second photodiode PD11 and the floating diffusion FD10 and controlled by a control signal TG11 applied to the gate thereof through a control line. The second transfer transistor TG11-Tr remains selected and in the conduction state during a transfer period PT in which the control signal TG11 is at the high (H) level, to transfer to the floating diffusion FD10 the charges (electrons) produced by the photoelectric conversion and then stored in the second photodiode PD11. After the second photodiode PD11 and the floating diffusion FD10 are reset to a predetermined reset potential, the second transfer transistor TG11-Tr enters the non-conduction state with the control signal TG11 being set to the low (L) level and the second photodiode PD11 enters a storing period PI. Under these circumstances, if the intensity of the incident light is very high (the amount of the incident light is very large), the charges above the well capacity overflow into the floating diffusion FD10 as overflow charges through the overflow path under the second transfer transistor TG11-Tr.

The third transfer transistor TG12-Tr of the pixel PXL20 is connected between the third photodiode PD12 and the floating diffusion FD10 and controlled by a control signal TG12 applied to the gate thereof through a control line. The third transfer transistor TG12-Tr remains selected and in the conduction state during a transfer period PT in which the control signal TG12 is at the high (H) level, to transfer to the floating diffusion FD10 the charges (electrons) produced by the photoelectric conversion and then stored in the third photodiode PD12. After the third photodiode PD12 and the floating diffusion FD10 are reset to a predetermined reset potential, the third transfer transistor TG12-Tr enters the non-conduction state with the control signal TG12 being set to the low (L) level and the third photodiode PD12 enters a storing period PI. Under these circumstances, if the intensity of the incident light is very high (the amount of the incident light is very large), the charges above the well capacity overflow into the floating diffusion FD10 as overflow charges through the overflow path under the third transfer transistor TG12-Tr.

The fourth transfer transistor TG13-Tr of the pixel PXL20 is connected between the fourth photodiode PD13 and the floating diffusion FD10 and controlled by a control signal TG13 applied to the gate thereof through a control line. The fourth transfer transistor TG13-Tr remains selected and in the conduction state during a transfer period PT in which the control signal TG13 is at the high (H) level, to transfer to the floating diffusion FD10 the charges (electrons) produced by the photoelectric conversion and then stored in the fourth photodiode PD13. After the fourth photodiode PD13 and the floating diffusion FD10 are reset to a predetermined reset potential, the fourth transfer transistor TG13-Tr enters the non-conduction state with the control signal TG13 being set to the low (L) level and the fourth photodiode PD13 enters a storing period PI. Under these circumstances, if the intensity of the incident light is very high (the amount of the incident light is very large), the charges above the well capacity overflow into the floating diffusion FD10 as overflow charges through the overflow path under the fourth transfer transistor TG13-Tr.

The reset transistor RST10-Tr is connected between the power supply line Vaapix of the power supply voltage VAAPIX and the floating diffusion FD10 and controlled by a control signal RST10 applied to the gate thereof through a control line. The reset transistor RST10-Tr remains selected and in the conduction state during a reset period in which the control signal RST10 is at the H level, to reset the floating diffusion FD10 to the potential of the power supply line Vaapix of the power supply voltage VAAPIX.

The source follower transistor SF10-Tr and the selection transistor SEL10-Tr are connected in series between the power supply line Vaapix and the vertical signal line LSGN10. The gate of the source follower transistor SF10-Tr is connected to the floating diffusion FD10, and the selection transistor SEL10-Tr is controlled through a control signal SEL10. The source follower transistor SF10-Tr serving as a source follower element is connected at the source thereof to the reading node ND10, at the drain thereof to the power supply line Vaapix, and at the gate thereof to the floating diffusion FD10. The reading node ND10, which is connected to the source of the source follower transistor SF10-Tr, is connected to the vertical signal line LSGN10 via the selection transistor SEL10-Tr. The selection transistor SEL10-Tr remains selected and in the conduction state during a period in which the control signal SEL10 is at the H level. In this way, the source follower transistor SF10-Tr outputs, to the vertical signal line LSGN10, a read-out signal VSL (PIXOUT) of a column output, which is obtained by converting the charges of the floating diffusion FD10 with a gain into a voltage signal. These operations are performed simultaneously and in parallel for pixels in each row since, for example, the gates of the transfer transistors TG10-Tr, the reset transistors RST10-Tr, and the selection transistors SEL10-Tr in each row are connected to each other.

Figure 8:
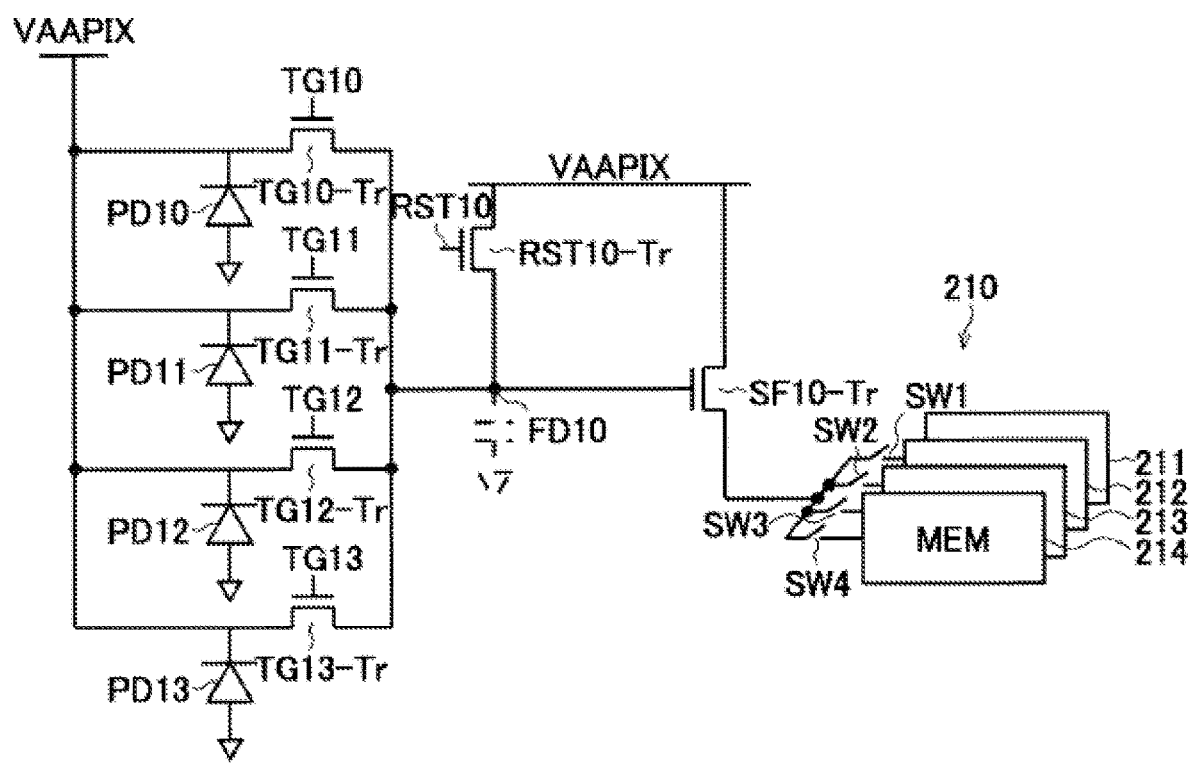
FIG. 8 shows, as an example, how to configure a group of in-pixel memories in the solid-state imaging device relating to the first embodiment of the present invention.

When the solid-state imaging device 10 has a global shutter function, the pixel PXL20 may include a group of in-pixel memories 210 for the global shutter, as shown in FIG. 8. In the example of the group of memories 210 in FIG. 8, four memories 211-214 corresponding to the four sub-pixels forming the pixel PXL20 are provided. According to the present example, the pixel PXL20 is configured such that the memories 211 to 214 are selectively accessible through switching elements SW1 to SW4.

The vertical scanning circuit 30 drives the pixels in shutter and read-out rows through the row-scanning control lines in response to the control by the timing control circuit 60, under the control of the access control part 80. Further, the vertical scanning circuit 30 outputs, according to an address signal, row selection signals indicating the row addresses of the reading row from which signals are to be read out and the shutter row in which the charges stored in the photodiodes PD are to be reset.

As described above, in a normal pixel reading operation, the vertical scanning circuit 30 drives the pixels in such a manner that shutter scan is followed by reading scan.

The reading circuit 40 includes a plurality of column signal processing circuits (not shown) arranged corresponding to the column outputs of the pixel part 20, and the reading circuit 40 may be configured such that the plurality of column signal processing circuits can perform column parallel processing.

The reading circuit 40 may include a correlated double sampling (CDS) circuit, an analog-to-digital converter (ADC), an amplifier (AMP), a sample/hold (S/H) circuit, and the like.

Figure 9A:
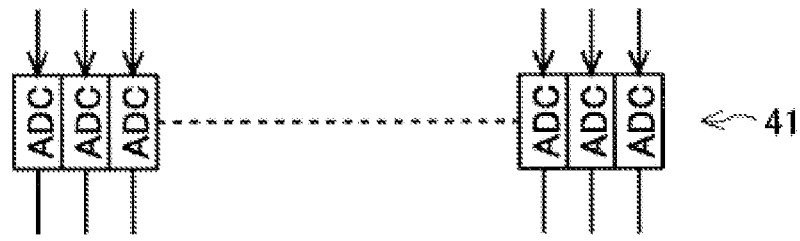
FIGS. 9A, 9B and 9C illustrate example configurations of a reading system of a column output from a pixel part of the solid-state imaging device according to the first embodiment of the present invention.
Figure 9B:
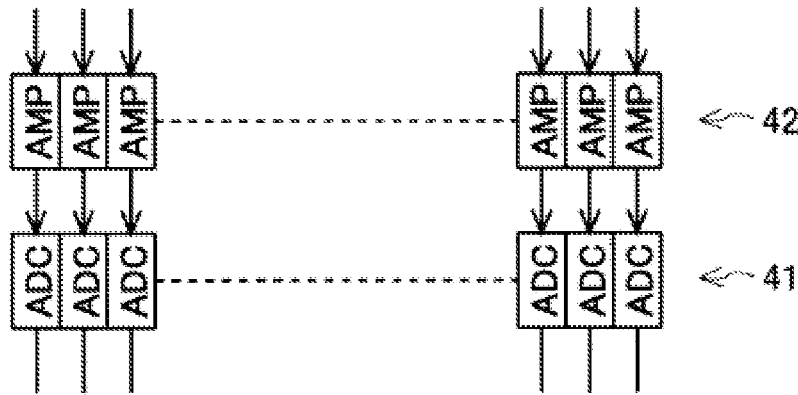
Figure 9C:
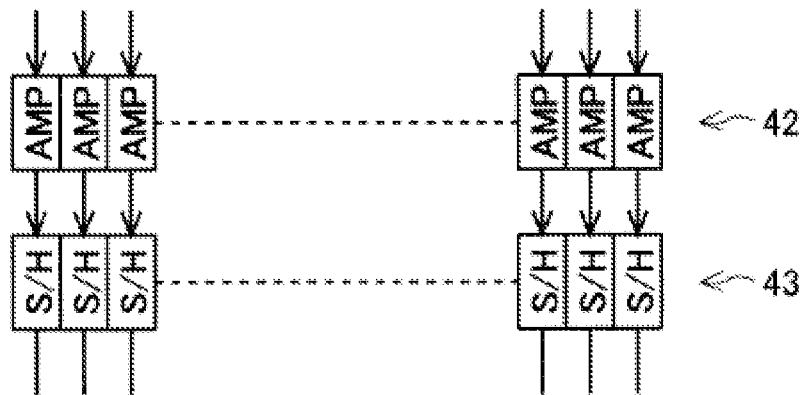

As mentioned above, as shown in FIG. 9A, for example, the reading circuit 40 may include ADCs 41 for converting the read-out signals VSL output from the columns of the pixel part 20 into digital signals. Alternatively, as shown in FIG. 9B, for example, the reading circuit 40 may include amplifiers (AMPs) 42 for amplifying the read-out signals VSL output from the columns of the pixel part 20. As yet another alternative, as shown in FIG. 9C, the reading circuit 40 may include sample/hold (S/H) circuits 43 for sampling/holding the read-out signals VSL output from the columns of the pixel part 20.

The horizontal scanning circuit 50 scans the signals processed in the plurality of column signal processing circuits of the reading circuit 40 such as ADCs, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like, under the control of the access control part 80.

In a rolling shutter mode, the reading part 70 controls the accesses to the pixels PXL20 arranged in the pixel part 20 to read the pixel signals on a row-by-row basis, under the control of the access control part 80. In a global shutter mode, the reading part 70 controls the accesses to the pixels PXL20 arranged in the pixel part 20 to read the pixel signals on a row-by-row basis, under the control of the access control part 80. The reading part 70 controls accesses for standard exposure or multiple exposure, under the control of the access control part 80.

FIG. 4 shows a basic structure of the access control part 80 relating to the first embodiment. The access control part 80 includes an exposure duration setting part 810, a mode selecting part 820, and an image combining part 830.

The mode selecting part 820 performs mode selection based on acquired captured scene information in order to select whether to perform access control on the pixel part 20 in a manner corresponding to a normal capturing mode involving standard exposure or in a manner corresponding to a multiple exposure mode involving multiple exposure.

In the normal capturing mode, the exposure duration setting part 810 sets a standard exposure duration determined by brightness of an object (subject), and the access control part 80 controls the accesses such that exposure is automatically performed according to the set standard exposure duration.

In the multiple exposure mode, the exposure duration setting part 810 sets different charge integration periods TE and charge storage starting times STE between the photodiodes PD10 to PD13 of the sub-pixels SPXL of the pixel PXL20.

In other words, in the multiple exposure mode, the access control part 80 individually controls the accesses to the sub-pixels SPXL_0, SPXL_1, SPXL_2, and SPXL_3 of the pixel PXL20, and the image combining part 830 combines the images captured with different exposure durations.

In the first embodiment, since the four sub-pixels SPXL_0, SPXL_1, SPXL_2, and SPXL_3 forming the pixel PXL20 have the same color or the first color Color1, the access control part 80 determines four different charge integration periods TE and four different charge storage starting times STE for the four photodiodes PD10 to PD13 in the pixel PXL20, where the number "4" is equal to the number of sub-pixels.

In the first embodiment, since the pixel PXL20 is made up by the four sub-pixels SPXL_0 to SPXL_3 of the same color, the access control part 80 sets the exposure durations in the following manner to accomplish quadruple exposure. The access control part 80 selects the short exposure period TSE1 as the charge integration period TE of the photodiode PD10 of the sub-pixels SPXL_0 to SPXL_3, the middle exposure period TME1 as the charge integration period TE of the photodiode PD11, the long exposure period TLE1 as the charge integration period TE of the photodiode PD12, and the very long exposure period TVLE1 as the charge integration period TE of the photodiode PD13. The access control part 80 further determines, for the pixel PXL20, the starting time STVLE1 of the very long exposure period TVLE1, the starting time STLE1 of the long exposure period TLE1, the starting time STME1 of the middle exposure period TME1, and the starting time STSE1 of the short exposure period TSE1.

Under these settings, the access control part 80 performs multiple exposure control on the pixel PXL20. The photodiode PD13 of the sub-pixel SPXL_3 with the longest charge integration period is first controlled to start storing charges, and the other photodiodes sequentially start storing charges (PD13→PD12→PD11→PD10). The charge integration period of the photodiode of any of the sub-pixels overlaps the charge integration period of the photodiode of the preceding sub-pixel. In the first embodiment, four charge integration periods are set. When three or more charge integration periods are set, the access control part 80 basically controls the charge integration periods such that all of them overlap each other.

The access control part 80 performs the multiple exposure control on the pixel PXL20 such that the charge integration periods of the sub-pixels of the same color all end before the end of the longest charge integration period. In the first embodiment, the access control part 80 performs the exposure control such that the charge integration periods of the sub-pixels of the same color end concurrently.

Figure 10:
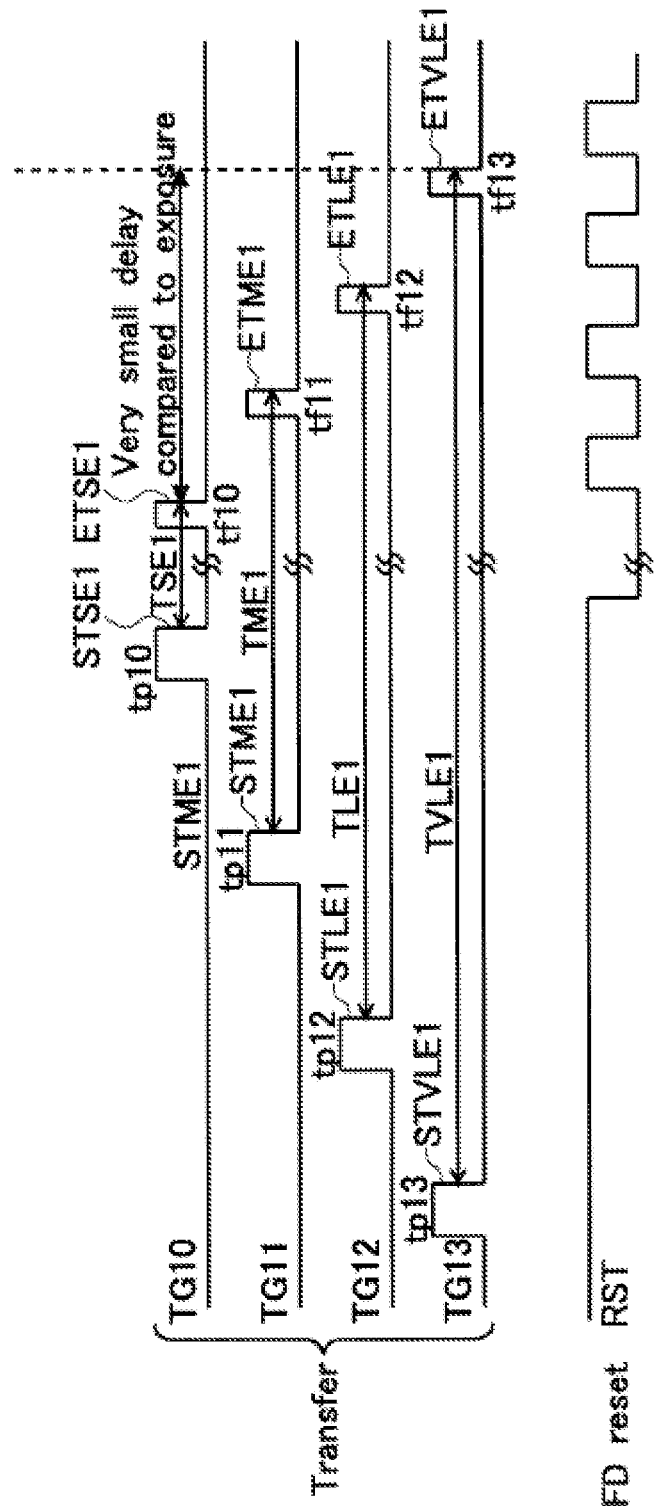
FIG. 10 is a timing chart showing how the sub-pixels operate in a multiple exposure mode in the solid-state imaging device relating to the first embodiment of the present invention.

FIG. 10 is a timing chart showing how the sub-pixels operate in the multiple exposure mode in the solid-state imaging device relating to the first embodiment of the present invention.

The following now describes what operations are performed in the pixel PXL20 of FIG. 7 in the multiple exposure mode.

In the multiple exposure mode, the access control part 80 first performs a shutter scan, specifically keeps the control signal RST at the high level to keep the reset transistor RST10-Tr in the conduction state and to keep the floating diffusion FD10 connected to the power supply potential VAAPIX so that the floating diffusion FD10 remains in the reset state. Under these settings, the access control part 80 controls the pixel PXL20 such that the photodiodes of the sub-pixels sequentially start storing charges, starting from the photodiode PD13 of the sub-pixel SPXL_3 with the longest charge integration period.

More specifically, the access control part 80 first keeps the control signal TG13 at the high level for a predetermined period tp13, so that the transfer transistor TG13-Tr of the sub-pixel SPXL_3 remains in the conduction state for the predetermined period tp13 and the charge storage region of the photodiode PD13 is connected to the floating diffusion FD10, which is in the reset state, thereby resetting the photodiode PD13. After the predetermined period tp13 elapses, the access control part 80 sets the control signal TG13 at the low level, so that the transfer transistor TG13-Tr of the sub-pixel SPXL_3 is switched to the non-conduction state and the very long exposure period TVLE1 starts. In other words, the timing at which the control signal TG13 is switched to the low level serves as the starting time STVLE1 of the very long exposure period TVLE1.

Subsequently, after a predetermined time interval, the access control part 80 keeps the control signal TG12 at the high level for a predetermined period tp12, so that the transfer transistor TG12-Tr of the sub-pixel SPXL_2 remains in the conduction state for the predetermined period tp12 and the charge storage region of the photodiode PD12 is connected to the floating diffusion FD10, which is in the reset state, thereby resetting the photodiode PD12. After the predetermined period tp12 elapses, the access control part 80 sets the control signal TG12 at the low level, so that the transfer transistor TG12-Tr of the sub-pixel SPXL_2 is switched to the non-conduction state and the long exposure period TLE1 starts. In other words, the timing at which the control signal TG12 is switched to the low level serves as the starting time STLE1 of the long exposure period TLE1.

Subsequently, after a predetermined time interval, the access control part 80 keeps the control signal TG11 at the high level for a predetermined period tp11, so that the transfer transistor TG11-Tr of the sub-pixel SPXL_1 remains in the conduction state for the predetermined period tp11 and the charge storage region of the photodiode PD11 is connected to the floating diffusion FD10, which is in the reset state, thereby resetting the photodiode PD11. After the predetermined period tp11 elapses, the access control part 80 sets the control signal TG11 at the low level, so that the transfer transistor TG11-Tr of the sub-pixel SPXL_1 is switched to the non-conduction state and the middle exposure period TME1 starts. In other words, the timing at which the control signal TG11 is switched to the low level serves as the starting time STME1 of the middle exposure period TME1.

Subsequently, after a predetermined time interval, the access control part 80 keeps the control signal TG10 to the high level for a predetermined period tp10, so that the transfer transistor TG10-Tr of the sub-pixel SPXL_0 remains in the conduction state for the predetermined period tp10 and the charge storage region of the photodiode PD10 is connected to the floating diffusion FD10, which is in the reset state, thereby resetting the photodiode PD10. After the predetermined period tp10 elapses, the access control part 80 sets the control signal TG10 at the low level, so that the transfer transistor TG10-Tr of the sub-pixel SPXL_0 is switched to the non-conduction state and the short exposure period TSE1 starts. In other words, the timing at which the control signal TG10 is switched to the low level serves as the starting time STSE1 of the short exposure period TSE1.

In the above-described manner, the multiple exposure control for a shutter scan is completed. The access control part 80 then sets the control signal RST at the low level to keep the reset transistor RST10-Tr in the non-conduction state and to electrically disconnect the floating diffusion FD10 from the power supply potential VAAPIX, thereby releasing the floating diffusion FD10 from the reset state.

Subsequently, a read-out scan is performed. Specifically, a first read-out operation for a reset signal is performed in a reset period, a transfer operation of transferring the charges stored in the photodiodes PD10 to PD13 of the sub-pixels SPXL_0 to SPXL_3 to the floating diffusion FD10 is performed in a transfer period, and a second read-out operation for a voltage signal determined by the transferred charges is performed.

The access control part 80 determines and sequentially ends the charge integration periods, and starts a transfer operation of transferring the charges stored on the photodiodes PD10 to PD13 of the sub-pixels SPXL_0 to SPXL_3 to the floating diffusion FD10. To do so, the access control part 80 sequentially places the transfer transistors TG10-Tr to TG13-Tr of the sub-pixels SPXL_0 to SPXL_3 in the conduction state respectively for predetermined transfer periods tf10 to tf13, starting from the transfer transistor TG10-Tr of the sub-pixel SPXL_0 with the shortest charge integration period. In this manner, the transfer periods tf10 to tf13 for transferring the charges stored in the photodiodes PD10 to PD13 of the sub-pixels SPXL_0 to SPXL_3 sequentially start, and the charge integration periods of the photodiodes PD10 to PD13 sequentially end.

More specifically, when a read-out scan is performed on the sub-pixel SPXL_0, in a transfer period tf10 following a first read-out operation in a reset period, the control signal TG10 is set at the high level so that the transfer transistor TG10-Tr of the sub-pixel SPXL_0 remains in the conduction state during the transfer period tf11 and the charges stored in the photodiode PD10 are transferred to the floating diffusion FD10. After the transfer period tf10 elapses, the control signal TG10 is set at the low level, so that the transfer transistor TG10-Tr of the sub-pixel SPXL_0 is switched to the non-conduction state and the short exposure period TSE1 ends. In other words, the timing at which the control signal TG10 is switched to the low level serves as the ending time ETSE1 of the short exposure period TSE1.

Subsequently, when a read-out scan is performed on the sub-pixel SPXL_1, in a transfer period tf11 following a first read-out operation in a reset period, the control signal TG11 is set at the high level so that the transfer transistor TG11-Tr of the sub-pixel SPXL_1 remains in the conduction state during the transfer period tf11 and the charges stored in the photodiode PD11 are transferred to the floating diffusion FD10. After the transfer period tf11 elapses, the control signal TG11 is set at the low level, so that the transfer transistor TG11-Tr of the sub-pixel SPXL_1 is switched to the non-conduction state and the middle exposure period TME1 ends. In other words, the timing at which the control signal TG11 is switched to the low level serves as the ending time ETME1 of the middle exposure period TME1.

Subsequently, when a read-out scan is performed on the sub-pixel SPXL_2, in a transfer period tf12 following a first read-out operation in a reset period, the control signal TG12 is set at the high level so that the transfer transistor TG12-Tr of the sub-pixel SPXL_2 remains in the conduction state during the transfer period tf12 and the charges stored in the photodiode PD12 are transferred to the floating diffusion FD10. After the transfer period tf12 elapses, the control signal TG12 is set at the low level, so that the transfer transistor TG12-Tr of the sub-pixel SPXL_2 is switched to the non-conduction state and the long exposure period TLE1 ends. In other words, the timing at which the control signal TG12 is switched to the low level serves as the ending time ETLE1 of the long exposure period TLE1.

Subsequently, when a read-out scan is performed on the sub-pixel SPXL_3, in a transfer period tf13 following a first read-out operation in a reset period, the control signal TG13 is set at the high level so that the transfer transistor TG13-Tr of the sub-pixel SPXL_3 remains in the conduction state during the transfer period tf13 and the charges stored in the photodiode PD13 are transferred to the floating diffusion FD10. After the transfer period tf13 elapses, the control signal TG13 is set at the low level, so that the transfer transistor TG13-Tr of the sub-pixel SPXL_3 is switched to the non-conduction state and the very long exposure period TVLE1 ends. In other words, the timing at which the control signal TG13 is switched to the low level serves as the ending time ETVLE1 of the very long exposure period TVLE1.

As described above, the access control part 80 performs the multiple exposure control on the pixel PXL20 such that the charge integration periods TVLE1, TLE1, TME1 and TSE1 of the sub-pixels SPXL_0 to SPXL_3 of the same color (first color) all end before the end of the very long exposure period TVLE1, which has the longest period of time. In the first embodiment, the access control part 80 can alternatively perform the exposure control such that the charge integration periods of the sub-pixels of the same color end concurrently.

According to the first embodiment described above, the pixel PXL20 is divided into the plurality of, for example, the four sub-pixels SPXL_0, SPXL_1, SPXL_2 and SPXL_3 that have the same color or the first color (for example, G (green)) Color 1. In other words, the pixel PXL20 has a 4:0 configuration. The access control part 80 sets different charge integration periods TE and different charge storage starting times STE between the photoelectric conversion parts PD of the sub-pixels SPXL. The access control part 80 assigns the very long exposure period TVLE1, the long exposure period TLE1, the middle exposure period TME1 and the short exposure period TSE1 respectively to the charge integration periods TE of the photodiodes PD13 to PD10 of the sub-pixels SPXL_0 to SPXL_3. The access control part 80 further determines the starting time STVLE1 of the very long exposure period TVLE1, the starting time STLE1 of the long exposure period TLE1, the starting time STME1 of the middle exposure period TME1, and the starting time STSE1 of the short exposure period TSE1. The access control part 80 performs exposure control. The photodiodes of the sub-pixels sequentially start storing charges, starting from the photodiode of the sub-pixel with the longest charge integration period, and the charge integration period of the photodiode of any of the sub-pixels overlaps the charge integration period of the photodiode of the preceding sub-pixel. The access control part 80 performs the exposure control such that the charge storing periods of the sub-pixels of the same color all end before the end of the longest charge integration period.

As a consequence, the first embodiment is capable of achieving a high dynamic range based on multiple exposure technique, where images captured with different exposure durations are combined, with it being possible to prevent motion artifacts and LED flickers.

Second Embodiment

Figure 11:
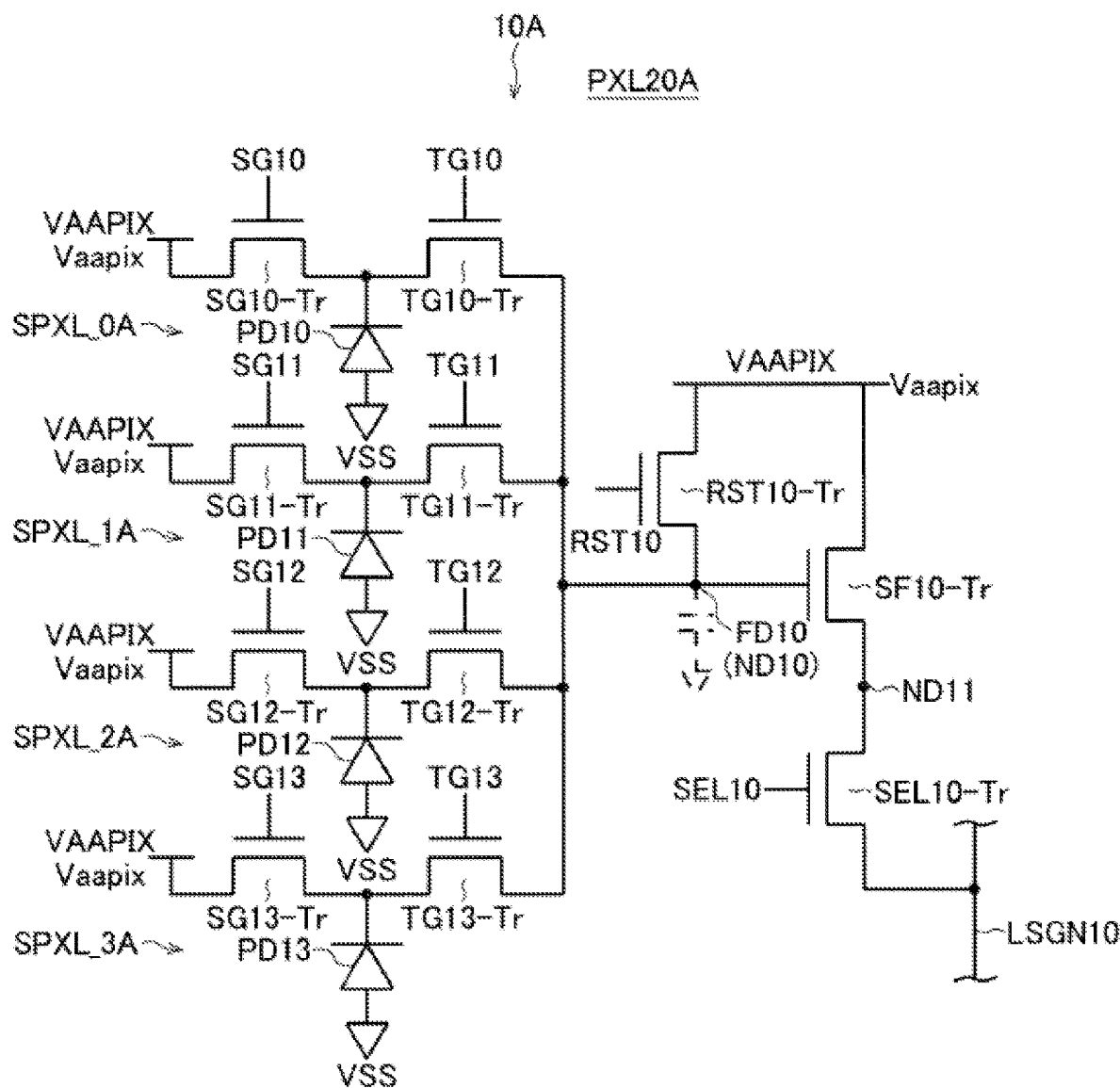
FIG. 11 is a circuit diagram showing an example of a pixel of a solid-state imaging device relating to a second embodiment of the present invention.
Figure 12:
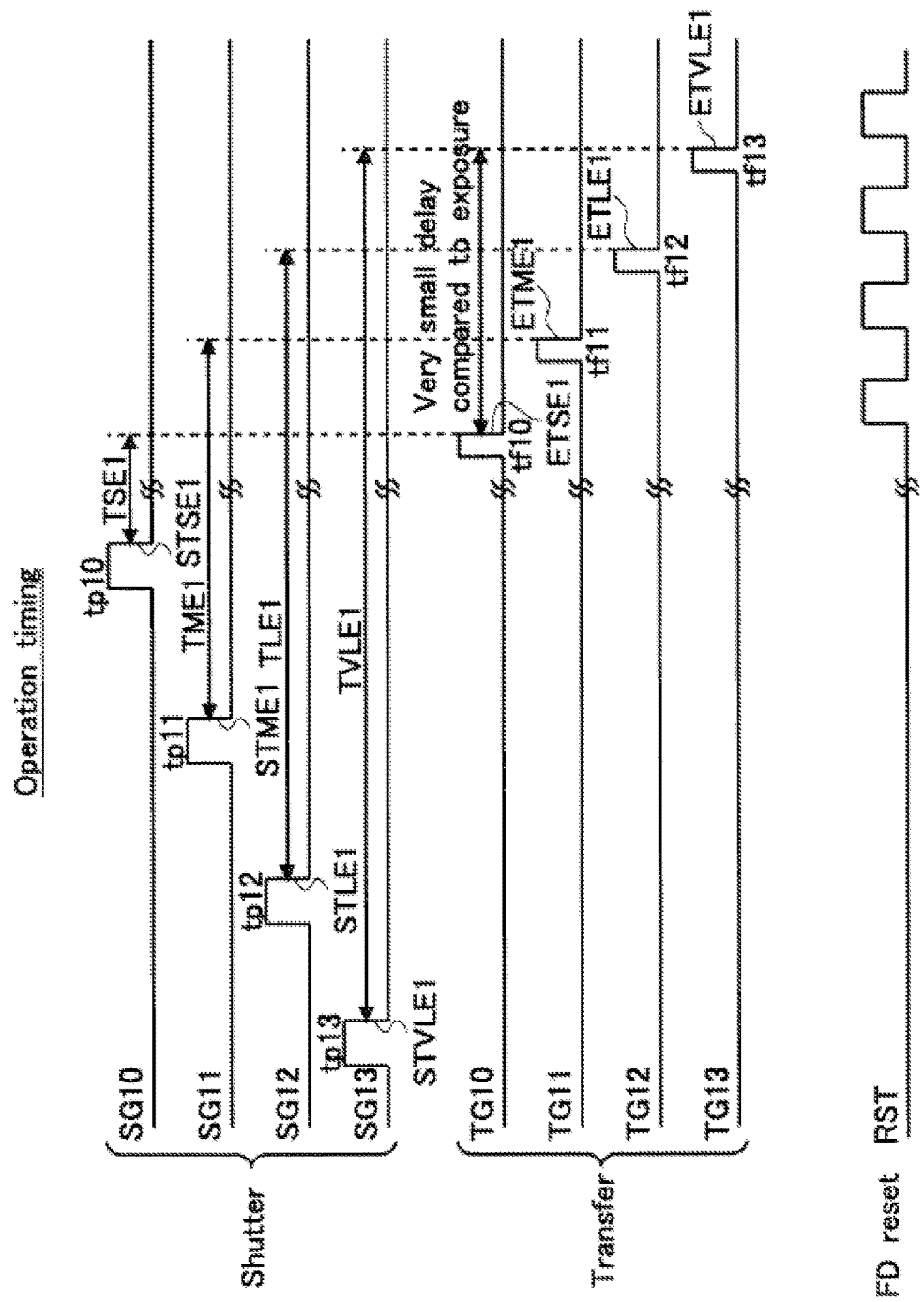
FIG. 12 is a timing chart showing how sub-pixels operate in a multiple exposure mode in the solid-state imaging device relating to the second embodiment of the present invention.

FIG. 11 is a circuit diagram showing an example of the pixels of a solid-state imaging device relating to a second embodiment of the present invention. FIG. 12 is a timing chart showing how sub-pixels operate in a multiple exposure mode in the solid-state imaging device relating to the second embodiment of the present invention.

A pixel 20A of a solid-state imaging device 10A relating to the second embodiment differs from the pixel 20 of the solid-state imaging device 10 relating to the above-described first embodiment in the following points.

The pixel PXL20A of the solid-state imaging device 10A of the second embodiment includes shutter gate transistors SG10-Tr, SG11-Tr, SG12-Tr and SG13-Tr, which are connected between (i) the charge storage parts of the photodiodes PD10, PD11, PD12 and PD13 and (ii) the power supply line Vaapix of the power supply voltage VAAPIX and which are configured to serve as charge overflow gate elements for allowing the charges to overflow from the photodiodes PD10, PD11, PD12 and PD13 toward the floating diffusion region or a region other than the floating diffusion region.

Specifically, in a sub-pixel SPXL_0A, a first transfer transistor TG10-Tr, which serves as a first transfer element, is connected between the first photodiode PD10 and the floating diffusion FD10, and a first shutter gate transistor SG10-Tr, which serves as a first charge overflow gate element, is connected between the first photodiode PD10 and a predetermined fixed potential VAAPIX.

In a sub-pixel SPXL_1A, a second transfer transistor TG11-Tr, which serves as a second transfer element, is connected between the second photodiode PD11 and the floating diffusion FD10, and a second shutter gate transistor SG11-Tr, which serves as a second charge overflow gate element, is connected between the second photodiode PD11 and the predetermined fixed potential VAAPIX.

In a sub-pixel SPXL_2A, a third transfer transistor TG12-Tr, which serves as a third transfer element, is connected between the third photodiode PD12 and the floating diffusion FD10, and a third shutter gate transistor SG12-Tr, which serves as a third charge overflow gate element, is connected between the third photodiode PD12 and the predetermined fixed potential VAAPIX.

In a sub-pixel SPXL_3A, a fourth transfer transistor TG13-Tr, which serves as a fourth transfer element, is connected between the fourth photodiode PD13 and the floating diffusion FD10, and a fourth shutter gate transistor SG13-Tr, which serves as a fourth charge overflow gate element, is connected between the fourth photodiode PD13 and the predetermined fixed potential VAAPIX.

As described above, the first shutter gate transistor SG10-Tr serving as the first charge overflow gate element is connected between the first photodiode PD10 and the predetermined fixed potential VAAPIX and controlled by a control signal SG10 applied thereto through a control line. The first shutter gate transistor SG10-Tr remains selected and in the conduction state during the period in which the control signal SG10 is at the H level, to form a drain path to release the charges generated at the first photodiode PD10 (to form an antiblooming path for the floating diffusion FD10) between the first photodiode PD10 and the predetermined fixed potential VAAPIX. In this way, unnecessary charges are released to the fixed potential VAAPIX.

In the sub-pixel SPXL_0A, the first transfer transistor TG10-Tr and the first shutter gate transistor SG10-Tr are driven and controlled at individually selected timings.

The second shutter gate transistor SG11-Tr serving as the second charge overflow gate element is connected between the second photodiode PD11 and the predetermined fixed potential VAAPIX and controlled by a control signal SG11 applied thereto through a control line. The second shutter gate transistor SG11-Tr remains selected and in the conduction state during the period in which the control signal SG11 is at the H level, to form a drain path to release the charges generated at the second photodiode PD11 (to form an antiblooming path for the floating diffusion FD10) between the second photodiode PD11 and the predetermined fixed potential VAAPIX. In this manner, unnecessary charges are released to the fixed potential VAAPIX.

In the sub-pixel SPXL_1A, the second transfer transistor TG11-Tr and the second shutter gate transistor SG11-Tr are driven and controlled at individually selected timings.

The third shutter gate transistor SG12-Tr serving as the third charge overflow gate element is connected between the third photodiode PD12 and the predetermined fixed potential VAAPIX and controlled by a control signal SG12 applied thereto through a control line. The third shutter gate transistor SG12-Tr remains selected and in the conduction state during the period in which the control signal SG12 is at the H level, to form a drain path to release the charges generated at the third photodiode PD12 (to form an antiblooming path for the floating diffusion FD10) between the third photodiode PD12 and the predetermined fixed potential VAAPIX. In this manner, unnecessary charges are released to the fixed potential VAAPIX.

In the sub-pixel SPXL_2A, the third transfer transistor TG12-Tr and the third shutter gate transistor SG12-Tr are driven and controlled at individually selected timings.

The fourth shutter gate transistor SG13-Tr serving as the fourth charge overflow gate element is connected between the fourth photodiode PD13 and the predetermined fixed potential VAAPIX and controlled by a control signal SG13 applied thereto through a control line. The fourth shutter gate transistor SG13-Tr remains selected and in the conduction state during the period in which the control signal SG13 is at the H level, to form a drain path to release the charges generated at the fourth photodiode PD13 (to form an antiblooming path for the floating diffusion FD10) between the fourth photodiode PD13 and the predetermined fixed potential VAAPIX. In this manner, unnecessary charges are released to the fixed potential VAAPIX.

In the sub-pixel SPXL_3A, the fourth transfer transistor TG13-Tr and the fourth shutter gate transistor SG13-Tr are driven and controlled at individually selected timings.

In addition, for the first shutter gate transistor SG10-Tr serving as the first charge overflow gate element, the second shutter gate transistor SG11-Tr serving as the second charge overflow element, the third shutter gate transistor SG12-Tr serving as the third charge overflow element, and the fourth shutter gate transistor SG13-Tr serving as the fourth charge overflow element, their threshold values may be individually adjusted.

In the second embodiment, for example, the access control part 80 performs exposure control such that the shutter gates SG10-Tr to SG13-Tr of the sub-pixels SPXL_0A to SPXL_3A are sequentially placed in the conduction state for a predetermined period of time, starting from the shutter gate SG10-Tr of the sub-pixel SPXL_3A having the longest charge integration period TE, to reset the photodiodes PD, and the photodiodes PD10 to PD13 of the sub-pixels SPXL_0A to SPXL_3A then sequentially initiate their respective charge integration periods. The access control part 80 then sequentially places the transfer transistors TG10-Tr to TG13-Tr of the sub-pixels SPXL_0A to SPXL_3A in the conduction state for a predetermined period of time, starting from the transfer transistor TG10-Tr of the sub-pixel SPXL_0A with the shortest charge integration period TE, so that the charge integration periods of the photodiodes PD10 to PD13 of the sub-pixels SPXL_0A to SPXL3A sequentially end and the transfer periods sequentially start for transferring the charges stored in the photodiodes PD10 to PD13.

In the second embodiment, for example, the access control part 80 may perform the exposure control such that a series of operations are repeatedly performed until the very long charge integration period TVLE of the sub-pixel SPXL_3A ends. The series of operations includes the following: the transfer transistors of the sub-pixels are sequentially placed in the conduction state for a predetermined period of time, starting from the transfer transistor of the sub-pixel SPXL_0A with the short charge integration period TSE, so that the charge integration periods of the photodiodes PD10 to PD13 of the sub-pixels SPXL_0A to SPXL_3A sequentially end; the shutter gates SG10-Tr to SG13-Tr of the sub-pixels are then placed in the conduction state for a predetermined period of time to reset the photodiodes PD10 to PD13; the charge integration periods of the photodiodes PD10 to PD13 of the sub-pixels SPXL_0A to SPXL_3A subsequently sequentially start again; and the transfer transistors of the sub-pixels are then sequentially placed in the conduction state for a predetermined period of time, starting from the transfer transistor TG10-Tr of the sub-pixel SPXL_0A, so that the charge integration periods of the photodiodes PD10 to PD13 of the sub-pixels SPXL_0A to SPXL_3A sequentially end.

The following now describes what operations are performed in the pixel PXL20A of FIG. 11 in the multiple exposure mode with reference to FIG. 12.

In the multiple exposure mode, the access control part 80 first performs a shutter scan, specifically sets the control signal RST at the high level to keep the reset transistor RST10-Tr in the conduction state and to keep the floating diffusion FD10 connected to the power supply potential VAAPIX so that the floating diffusion FD10 remains in the reset state. Under these settings, the access control part 80 controls the pixel PXL20A such that the photodiodes of the sub-pixels sequentially start storing charges, starting from the photodiode PD13 of the sub-pixel SPXL_3A with the longest charge integration period.

More specifically, the access control part 80 first keeps the control signal SG13 at the high level for a predetermined period tp13, so that the shutter gate transistor SG13-Tr of the sub-pixel SPXL_3A remains in the conduction state for the predetermined period tp13 and the charge storage region of the photodiode PD13 is connected to the fixed potential VAAPIX, thereby resetting the photodiode PD13. After the predetermined period tp13 elapses, the access control part 80 sets the control signal SG13 at the low level, so that the shutter gate transistor TG13-Tr of the sub-pixel SPXL_3A is switched to the non-conduction state and the very long exposure period TVLE1 starts. In other words, the timing at which the control signal SG13 is switched to the low level serves as the starting time STVLE1 of the very long exposure period TVLE1.

Following this, after a predetermined time interval, the access control part 80 keeps the control signal SG12 at the high level for a predetermined period tp12, so that the shutter gate transistor SG12-Tr of the sub-pixel SPXL_2A remains in the conduction state for the predetermined period tp12 and the charge storage region of the photodiode PD12 is connected to the fixed potential VAAPIX, thereby resetting the photodiode PD12. After the predetermined period tp12 elapses, the access control part 80 sets the control signal SG12 at the low level, so that the shutter gate transistor SG12-Tr of the sub-pixel SPXL_2A is switched to the non-conduction state and the long exposure period TLE1 starts. In other words, the timing at which the control signal SG12 is switched to the low level serves as the starting time STLE1 of the long exposure period TLE1.

Following this, after a predetermined time interval, the access control part 80 keeps the control signal SG11 at the high level for a predetermined period tp11, so that the shutter gate transistor SG11-Tr of the sub-pixel SPXL_1A remains in the conduction state for the predetermined period tp12 and the charge storage region of the photodiode PD11 is connected to the fixed potential VAAPIX, thereby resetting the photodiode PD11. After the predetermined period tp11 elapses, the access control part 80 sets the control signal SG11 at the low level, so that the shutter gate transistor SG11-Tr of the sub-pixel SPXL_1A is switched to the non-conduction state and the middle exposure period TME1 starts. In other words, the timing at which the control signal SG11 is switched to the low level serves as the starting time STME1 of the middle exposure period TME1.

Following this, after a predetermined time interval, the access control part 80 keeps the control signal SG10 at the high level for a predetermined period tp10, so that the shutter gate transistor SG10-Tr of the sub-pixel SPXL_0A remains in the conduction state for the predetermined period tp10 and the charge storage region of the photodiode PD10 is connected to the fixed potential VAAPIX, thereby resetting the photodiode PD10. The shutter gate transistor SG10-Tr of the sub-pixel SPXL_0A is switched to the non-conduction state and the short exposure period TSE1 starts. In other words, the timing at which the control signal SG10 is switched to the low level serves as the starting time STSE1 of the short exposure period TSE1.

In the above-described manner, the multiple exposure control for a shutter scan is completed. Subsequently, a read-out scan is performed. Specifically, a first read-out operation for a reset signal is performed in a reset period, a transfer operation of transferring the charges stored in the photodiodes PD10-PD13 of the sub-pixels SPXL_0A to SPXL3A to the floating diffusion FD10 is performed in a transfer period, and a second read-out operation for a voltage signal determined by the transferred charges is performed.

The access control part 80 determines and sequentially terminates the charge integration periods, and controls the photodiodes PD10 to PD13 of the sub-pixels SPXL_0A to SPXL_3A to start transferring the charges stored therein to the floating diffusion FD10. To do so, the access control part 80 places the transfer transistors TG10-Tr to TG13-Tr of the sub-pixels SPXL_0A to SPXL_3A in the conduction state sequentially and respectively for predetermined transfer periods tf10 to tf13, starting from the transfer transistor TG10Tr of the sub-pixel SPXL_0A with the shortest charge integration period. In this manner, the transfer periods tf10 to tf13 for transferring the charges stored in the photodiodes PD10 to PD13 of the sub-pixels SPXL_0A to SPXL_3A sequentially start, and the charge integration periods of the photodiodes PD10 to PD13 sequentially end.

More specifically, when a read-out scan is performed on the sub-pixel SPXL_0A, in the transfer period tf10 following a first read-out operation in a reset period, the control signal TG10 is set at the high level so that the transfer transistor TG10-Tr of the sub-pixel SPXL_0A remains in the conduction state during the transfer period tf10 and the charges stored in the photodiode PD10 are transferred to the floating diffusion FD10. After the transfer period tf10 elapses, the control signal TG10 is set at the low level, so that the transfer transistor TG10-Tr of the sub-pixel SPXL_0A is switched to the non-conduction state and the short exposure period TSE1 ends. In other words, the timing at which the control signal TG10 is switched to the low level serves as the ending time ETSE1 of the short exposure period TSE1.

Subsequently, when a read-out scan is performed on the sub-pixel SPXL_1A, in the transfer period tf11 following a first read-out operation in a reset period, the control signal TG11 is set at the high level so that the transfer transistor TG11-Tr of the sub-pixel SPXL_1A remains in the conduction state during the transfer period tf11 and the charges stored in the photodiode PD11 are transferred to the floating diffusion FD10. After the transfer period tf11 elapses, the control signal TG11 is set at the low level, so that the transfer transistor TG11-Tr of the sub-pixel SPXL_1A is switched to the non-conduction state and the middle exposure period TME1 ends. In other words, the timing at which the control signal TG11 is switched to the low level serves as the ending time ETME1 of the middle exposure period TME1.

Subsequently, when a read-out scan is performed on the sub-pixel SPXL_2A, in the transfer period tf12 following a first read-out operation in a reset period, the control signal TG12 is set at the high level so that the transfer transistor TG12-Tr of the sub-pixel SPXL_2A remains in the conduction state during the transfer period tf12 and the charges stored in the photodiode PD12 are transferred to the floating diffusion FD10. After the transfer period tf12 elapses, the control signal TG12 is set at the low level, so that the transfer transistor TG12-Tr of the sub-pixel SPXL_2A is switched to the non-conduction state and the long exposure period TLE1 ends. In other words, the timing at which the control signal TG12 is switched to the low level serves as the ending time ETLE1 of the long exposure period TLE1.

Subsequently, when a read-out scan is performed on the sub-pixel SPXL_3A, in the transfer period tf13 following a first read-out operation in a reset period, the control signal TG13 is set at the high level so that the transfer transistor TG13-Tr of the sub-pixel SPXL_3A remains in the conduction state during the transfer period tf13 and the charges stored in the photodiode PD13 are transferred to the floating diffusion FD10. After the transfer period tf13 elapses, the control signal TG13 is set at the low level, so that the transfer transistor TG13-Tr of the sub-pixel SPXL_3A is switched to the non-conduction state and the very long exposure period TVLE1 ends. In other words, the timing at which the control signal TG13 is switched to the low level serves as the ending time ETVLE1 of the very long exposure period TVLE1.

As described above, the access control part 80 performs the multiple exposure control on the pixel PXL20A such that the charge integration periods TVLE1, TLE1, TME1 and TSE1 of the sub-pixels SPXL_0A to SPXL3A of the same color (first color) all end before the end of the very long exposure period TVLE, which has the longest period of time. In the second embodiment, the access control part 80 can also perform the exposure control such that the charge integration periods of the sub-pixels of the same color end concurrently.

As described above, the sub-pixels SPXL_0A to SPXL_3A of the second embodiment include the shutter gate transistors SG10-Tr, SG11-Tr, SG12-Tr and SG13-Tr, which are connected between (i) the charge storage units of the photodiodes PD10, PD11, PD12 and PD13 and (ii) the power supply line Vaapix of the power supply voltage VAAPIX and which are configured to serve as charge overflow gate elements for allowing the charges to overflow from the photodiodes PD toward the floating diffusion region or a region other than the floating diffusion region. The second embodiment thus makes it possible not only to produce the same effects as the above-described first embodiment but also to produce the following effects.

The second embodiment can prevent mixing of charges (which can result in false signals), which is caused by the signals indicative of the charges exceeding the charges that can be stored on a given photodiode PD (overflow charges) flowing into adjacent pixels.

Third Embodiment

Figure 13:
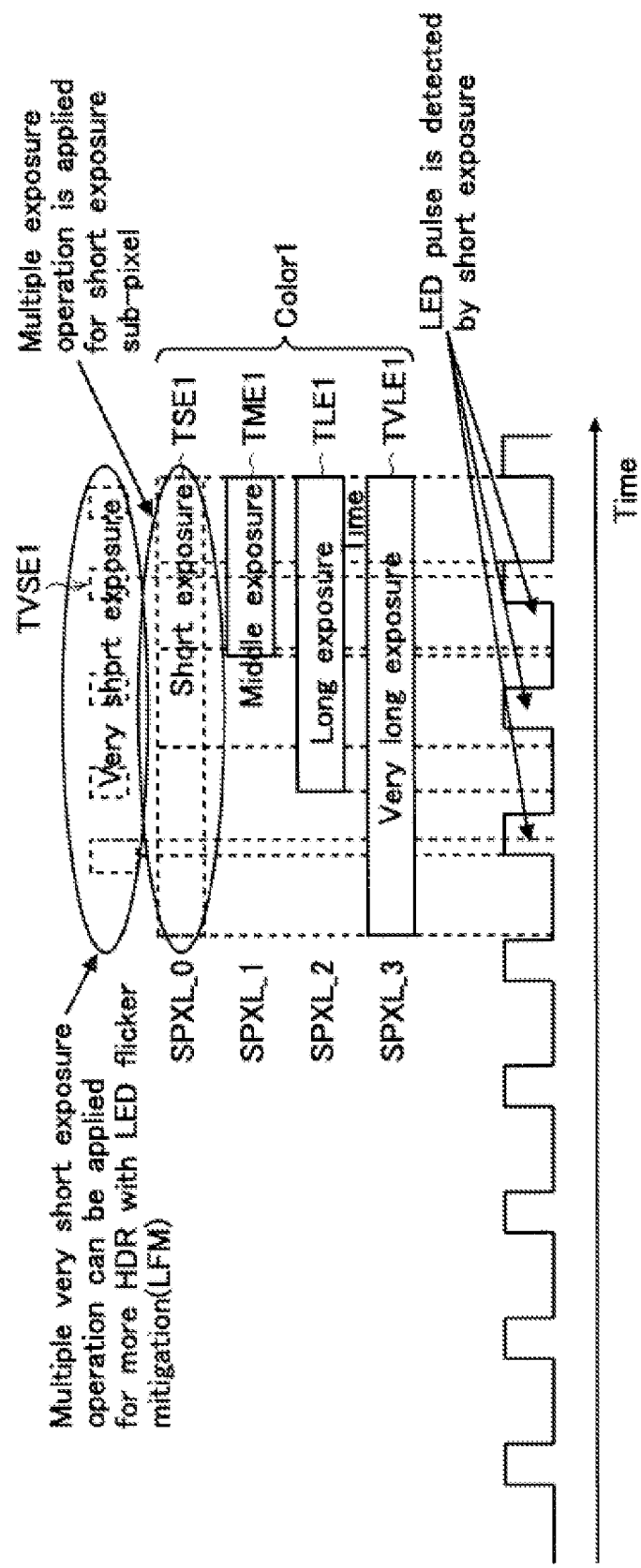
FIG. 13 briefly shows how sub-pixels operate in a multiple exposure mode in a solid-state imaging device relating to a third embodiment of the present invention.
Figure 14:
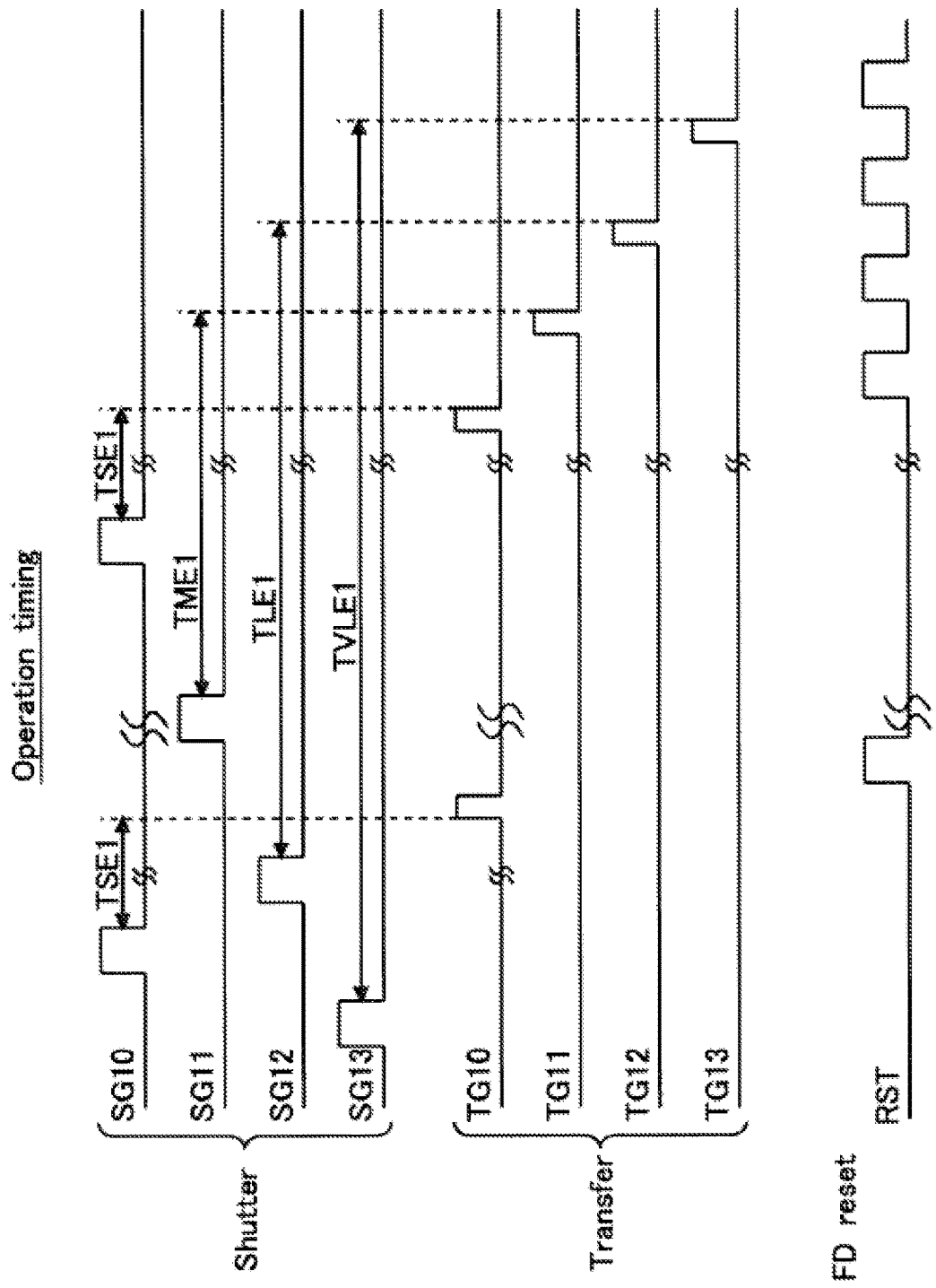
FIG. 14 is a timing chart showing how the sub-pixels operate in the multiple exposure mode in the solid-state imaging device relating to the third embodiment of the present invention.

FIG. 13 briefly shows how sub-pixels operate in a multiple exposure mode in a solid-state imaging device relating to a third embodiment of the present invention. FIG. 14 is a timing chart showing how the sub-pixels operate in a multiple exposure mode in the solid-state imaging device relating to the third embodiment of the present invention.

A solid-state imaging device 10B relating to the third embodiment differs from the solid-state imaging device 10A relating to the above-described second embodiment in the following points.

In the solid-state imaging device 10A relating to the second embodiment, the access control part 80 selects the very long exposure period TVLE1 once as the charge integration period TE of the photodiode PD13 of the sub-pixels SPXL_0A to SPXL_3A, selects the long exposure period TLE1 once as the charge integration period TE of the photodiode PD12, selects the middle exposure period TME1 once as the charge integration period TE of the photodiode PD11, and selects the short exposure period TSE1 once as the charge integration period TE of the photodiode PD10.

Figure 15:
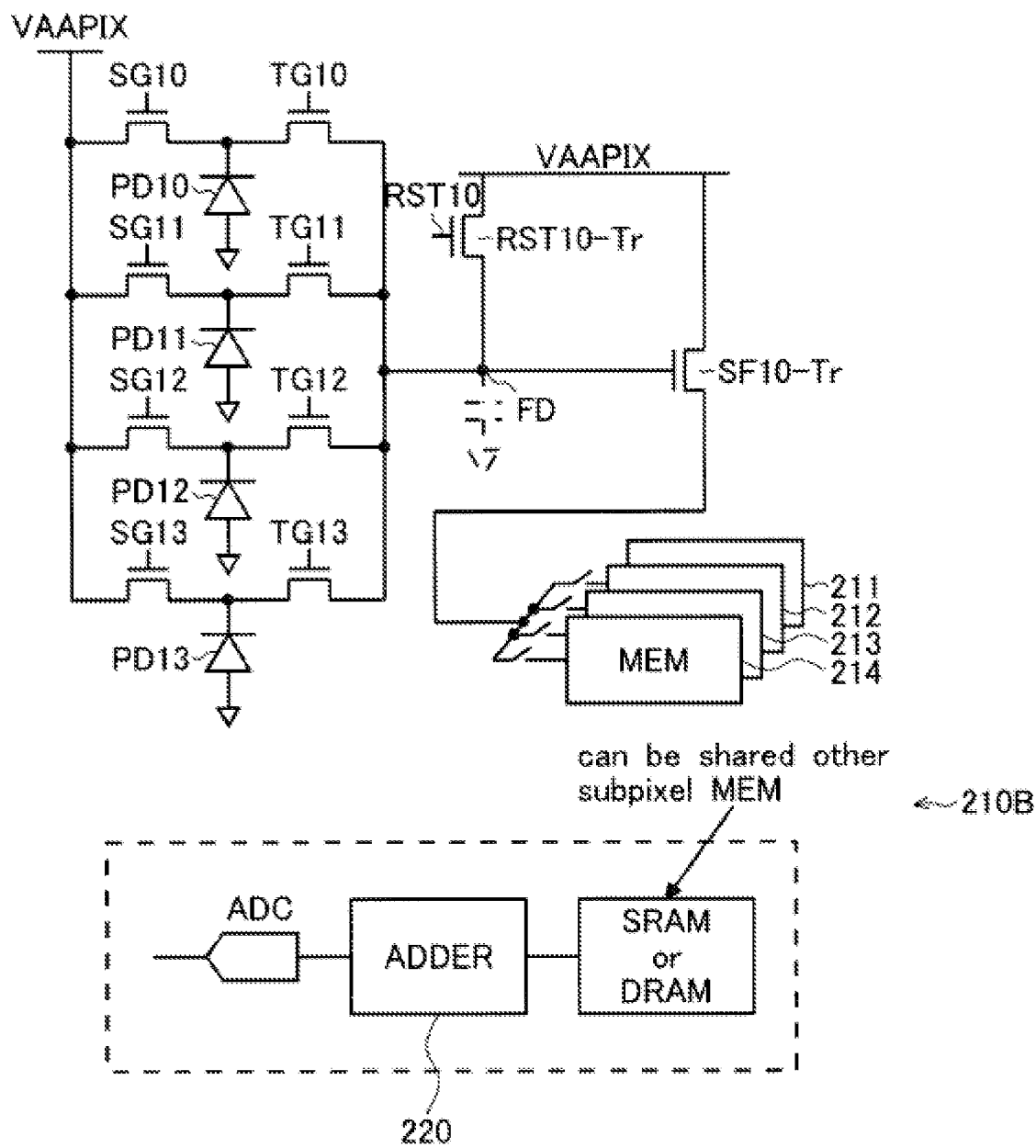
FIG. 15 shows, as an example, how to configure a group of in-pixel memories in the solid-state imaging device relating to the third embodiment of the present invention.

In the solid-state imaging device 10B relating to the third embodiment, on the other hand, the access control part 80 selects the very long exposure period TVLE1 once as the charge integration period TE of the photodiode PD13 of the sub-pixels SPXL_0 to SPXL_3, selects the long exposure period TLE1 once as the charge integration period TE of the photodiode PD12, and selects the middle exposure period TME1 once as the charge integration period TE of the photodiode PD11, as in the second embodiment, but also selects the short exposure period TSE1 multiple times as the charge integration period TE of the photodiode PD10 such that the short exposure period (or a very short exposure period TVSE1) including the transfer period is repeatedly performed within the very long exposure period TVLE1. The outputs produced by the repeatedly performed exposures are combined together by an adder 220 of an in-pixel memory unit 210B shown in FIG. 15.

The third embodiment can not only obtain the same effects as the first embodiment, but also further increase the dynamic range while significantly reducing the influence of the LED flickers.

Fourth Embodiment

Figure 16:
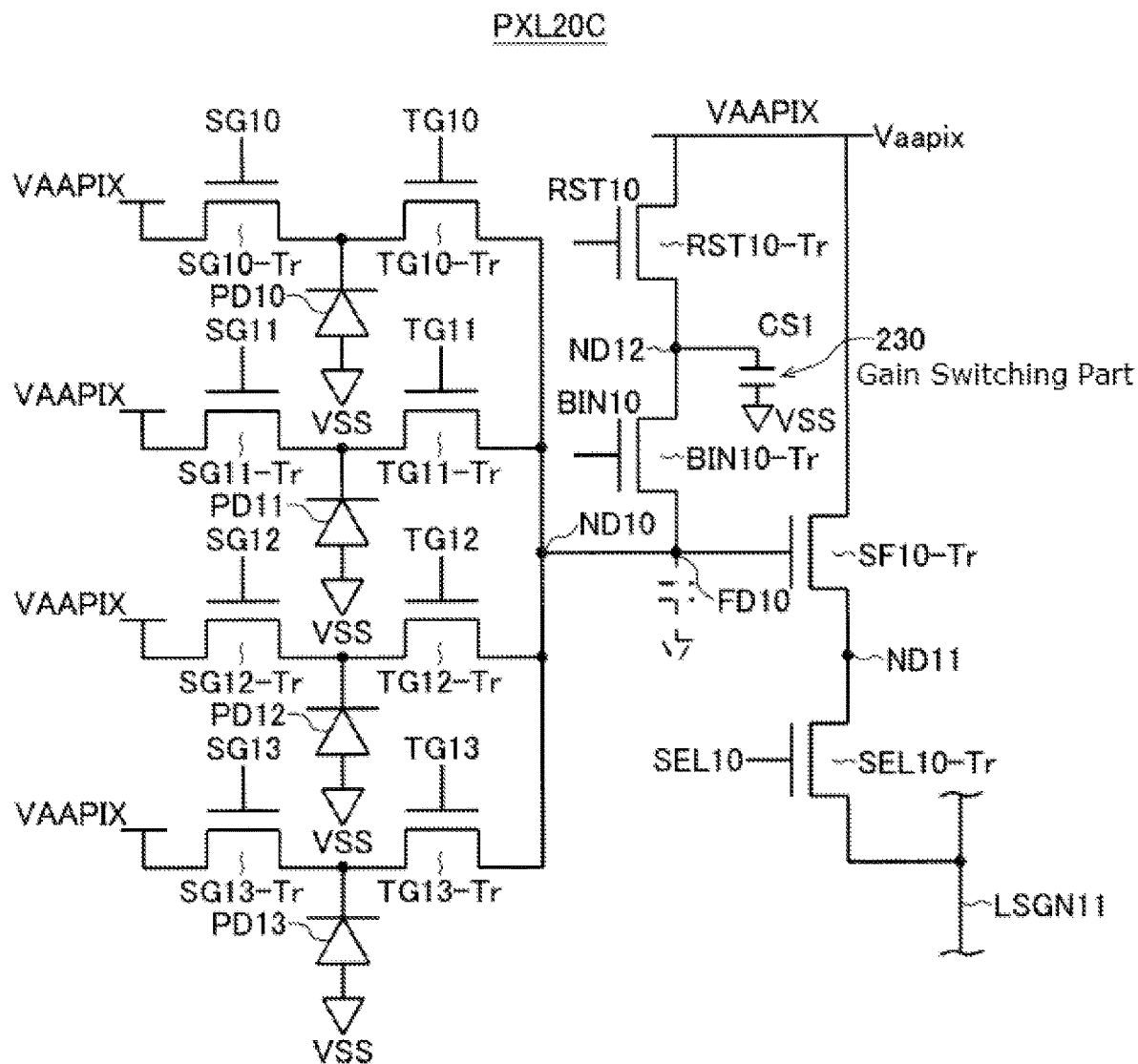
FIG. 16 is a circuit diagram showing an example of a pixel of a solid-state imaging device relating to a fourth embodiment of the present invention.

FIG. 16 is a circuit diagram showing an example of the pixels of a solid-state imaging device relating to a fourth embodiment of the present invention.

A pixel PXL20C of a solid-state imaging device 10C of the fourth embodiment has a dual-gain configuration. The pixel PXL20C of the solid-state imaging device 10C relating to the fourth embodiment differs from the pixel 20A of the solid-state imaging device 10A relating to the above-described second embodiment in the following points.

The pixel PXL20C relating to the fourth embodiment has a gain switching part 230 for switching the conversion gain of the source follower transistor SF10-Tr serving as an output buffer part. The gain switching part 230 is configured to change the capacitance of the floating diffusion FD10 serving as an output node, between a first capacitance and a second capacitance, so that the conversion gain can be changed between a first conversion gain corresponding to the first capacitance (for example, high conversion gain: HCG) and a second conversion gain corresponding to the second capacitance (for example, low conversion gain: LCG). The third embodiment employs a dual reading scheme, and one of the first and second conversion gains is selected by the amount of charges to be read and the selected conversion gain is used.

The gain switching part 230 includes a storage transistor BIN10-Tr serving as a storage element connected to the floating diffusion FD10, and a storage capacitor CS1 serving as a storage capacitance element configured to store the charges on the floating diffusion FD10 via the storage transistor BIN10-Tr.

The storage transistor BIN10-Tr is connected between the floating diffusion FD10 and the reset transistor RST10-Tr, and the storage capacitor CS is connected between a connection node ND12 and the reference potential VSS. The storage transistor BIN10-Tr is controlled by a control signal BIN10 applied to the gate thereof through a control line. The storage transistor BIN10-Tr remains selected and in the conduction state during a reset period in which the control signal BIN10 is at the H level so as to connect the floating diffusion FD10 and the storage capacitor CS1.

In the fourth embodiment, a read-out operation with a changeable gain is performed in the following manner. A first conversion gain signal reading operation HCGSRD is performed while the storage transistor BIN10-Tr remains in the non-conduction state, so that the charges in the floating diffusion FD10 serving as the output node ND10 are separated from the charges in the storage capacitor CS. A first conversion gain reset reading operation HCGRRD is performed while the storage transistor BIN10-Tr remains in the non-conduction state, so that the charges in the floating diffusion FD10 serving as the output node ND10 are separated from the charges in the storage capacitor CS. A second conversion gain signal reading operation LCGSRD is performed while the storage transistor BIN10-Tr remains in the conduction state, so that the charges in the floating diffusion FD10 serving as the output node ND10 are mixed with the charges in the storage capacitor CS. A second conversion gain reset reading operation LCGRRD is performed while the reset transistor RST10-Tr and the storage transistor BIN10-Tr remain in the conduction state, so that the charges in the floating diffusion FD10 serving as the output node ND10 and the charges in the storage capacitor CS are cleared.

In the pixel PXL20C of the fourth embodiment described above, the storage transistor BIN10-Tr is arranged between the floating diffusion FD10 and the reset transistor RST10-Tr, and the capacitance of the floating diffusion FD10 serving as the output node can be changed between the first capacitance and the second capacitance, so that the conversion gain can be switched between the first conversion gain HCG corresponding to the first capacitance and the second conversion gain LCG corresponding to the second capacitance. With such configurations, the pixel PXL20C is capable of performing dual-conversion-gain reading under the control of the access control part 80, in other words, performing reading twice using different ones of the first and second conversion gains depending on the amount of charges to be read. The following now outlines the operations performed in the dual-conversion-gain reading mode to read the first sub-pixel SPXL_0 and then read the second sub-pixel SPXL_1.

(Brief Description of Example Operations in Dual-Conversion-Gain Reading Mode)

In the first sub-pixel SPXL_0, the storage transistor BIN10-Tr is switched to the conduction state, and the gain of the floating diffusion FD10 is switched to the second conversion gain LCG, so that a second conversion gain reset reading operation is performed. The storage transistor BIN10-Tr is switched to the non-conduction state, and the gain of the floating diffusion FD10 is switched to the first conversion gain HCG, so that a first conversion gain reset reading operation is performed. The storage transistor BIN10-Tr remains in the non-conduction state, and the gain of the floating diffusion FD10 remains at the first conversion gain HCG, so that a transfer operation is performed in a first transfer period and a first conversion gain signal reading operation is subsequently performed. Subsequently, the storage transistor BIN10-Tr is switched to the conduction state, and the gain of the floating diffusion FD10 is switched to the second conversion gain LCG, so that a transfer operation is performed in a second transfer period and a second conversion gain signal reading operation is subsequently performed.

Following this, in the second sub-pixel SPXL_1, the storage transistor BIN10-Tr is switched to the conduction state, and the gain of the floating diffusion FD10 is switched to the second conversion gain LCG, so that a second conversion gain reset reading operation is performed. The storage transistor BIN10-Tr is switched to the non-conduction state, and the gain of the floating diffusion FD10 is switched to the first conversion gain HCG, so that a first conversion gain reset reading operation is performed. The storage transistor BIN10-Tr remains in the non-conduction state, and the gain of the floating diffusion FD10 remains at the first conversion gain HCG, so that a transfer operation is performed in a third transfer period and a first conversion gain signal reading operation is subsequently performed. Subsequently, the storage transistor BIN10-Tr is switched to the conduction state, and the gain of the floating diffusion FD10 is switched to the second conversion gain LCG, so that a transfer operation is performed in a fourth transfer period and a second conversion gain signal reading operation is subsequently performed.

As described above, the fourth embodiment includes the gain switching part 230, which includes the storage transistor BIN10-Tr and the storage capacitor CS. The gain switching part 230 is configured to change the capacitance of the floating diffusion FD10 serving as an output node between the first capacitance and the second capacitance, so that the conversion gain can be changed between the first conversion gain corresponding to the first capacitance (for example, high conversion gain: HCG) and the second conversion gain corresponding to the second capacitance (for example, low conversion gain: LCG). With such configurations, the full well capacity (FWC) of the floating diffusion FD is small when the gain is set at the high conversion gain (HCG) and large when the gain is set at the low conversion gain (LCG).

The fourth embodiment can not only produce the same effects as the above-described first to third embodiments but also provides for an increased dynamic range by performing reading in a predetermined mode while the pixel achieves a small size. Additionally, the fourth embodiment is capable of substantially achieving an increased dynamic range and a raised frame rate, achieving reduced noise.

Fifth Embodiment

Figure 17A:
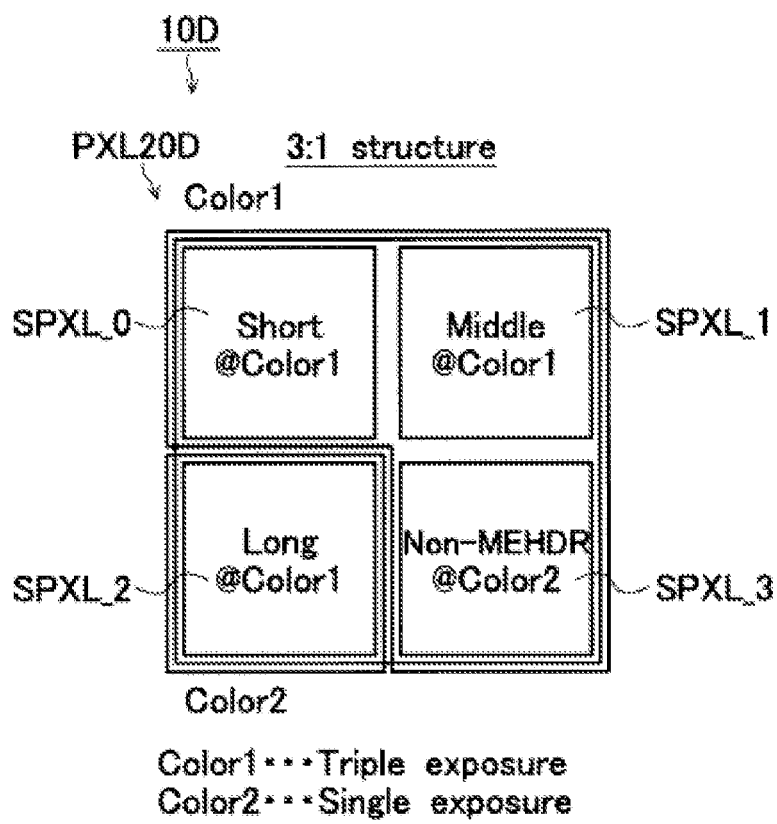
FIGS. 17A and 17B are used to illustrate colors, charge integration periods and other characteristics assigned to four sub-pixels of a single pixel of a solid-state imaging device relating to a fifth embodiment of the present invention.
Figure 17B:
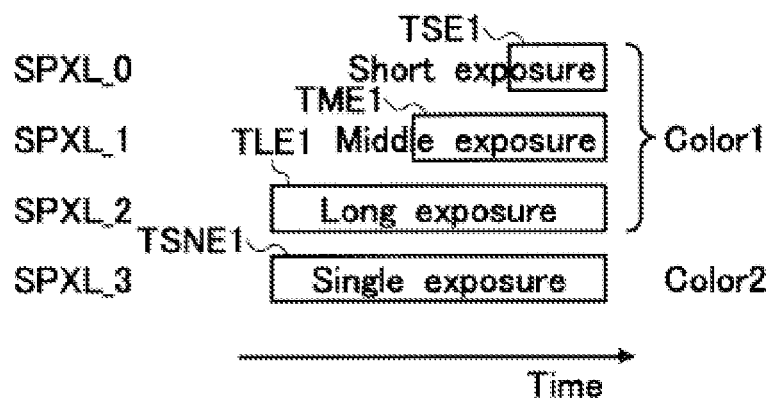

FIGS. 17A and 17B are used to illustrate colors, charge integration periods and other characteristics assigned to the four sub-pixels of a single pixel of a solid-state imaging device relating to a fifth embodiment of the present invention. FIG. 17A shows a 3:1 configuration employed by a solid-state imaging device 10D relating to the fifth embodiment, where four sub pixels SPXL_0, SPXL_1, SPXL_2, and SPXL_3 are provided and three of them or the sub-pixels SPXL_0, SPXL_1, SPXL_2 have the same color or a first color Color1, and the remaining one sub-pixel SPXL_3 has a second color Color2 (for example, R (red)). FIG. 17B schematically shows an example of a multiple exposure sequence for the 3:1 configuration.

According to the first to fourth embodiments, the pixels PXL20 to PXL20C all have the 4:0 configuration. More specifically, the pixels PXL20 to PXL20C are all divided into the plurality of, for example, the four sub-pixels SPXL_0, SPXL_1, SPXL_2 and SPXL_3 that have the same color or the first color (for example, G (green)) Color 1. The access control part 80 set different charge integration periods TE and different charge storage starting times STE between the photodiodes PD of the sub-pixels SPXL. In other words, the access control part 80 set different charge integration periods TE and different charge storage starting times STE, the number of which corresponds to the number of sub-pixels having the same color. Under these settings, the access control part 80 performs exposure control. The photodiodes of the sub-pixels sequentially start storing charges, starting from the photodiode of the sub-pixel with the longest charge integration period, and the charge integration period of the photodiode of any of the sub-pixels overlaps the charge integration period of the photodiode of the preceding sub-pixel.

In the fifth embodiment, on the other hand, the solid-state imaging device 10D has a 3:1 configuration, where the pixel PXL20D is divided into four sub-pixels SPXL_0, SPXL_1, SPXL_2, and SPXL_3, three of them or the sub-pixels SPXL_0, SPXL_1, SPXL_2 have the same color or the first color Color1, and the remaining one sub-pixel SPXL_3 has the second color Color2 (for example, R (red)). The access control part 80 sets the charge integration periods TE and the charge storage starting times STE of the sub-pixels in the following manner. The charge integration periods TE and charge storage starting times STE of the three sub-pixels SPXL_0, SPXL_1, SPXL_2, the number of which corresponds to the number of sub-pixels having the same color, differ from each other, but the charge integration periods TE overlap each other, and the sub-pixel SPXL_3 has a single charge integration period TSNE1.

The access control part 80 assigns the short exposure period TSE1, the middle exposure period TME1 and the long exposure period TLE1 to the three sub-pixels SPXL_0, SPX_1 and SPXL_2 such that the respective exposure periods overlap each other. The access control part 80 also determines the length (duration) of the single charge integration period TSNE1 to be equal to the long exposure period TLE1.

The fifth embodiment can produce the same effects as the above-described first to fourth embodiments.

Sixth Embodiment

Figure 18A:
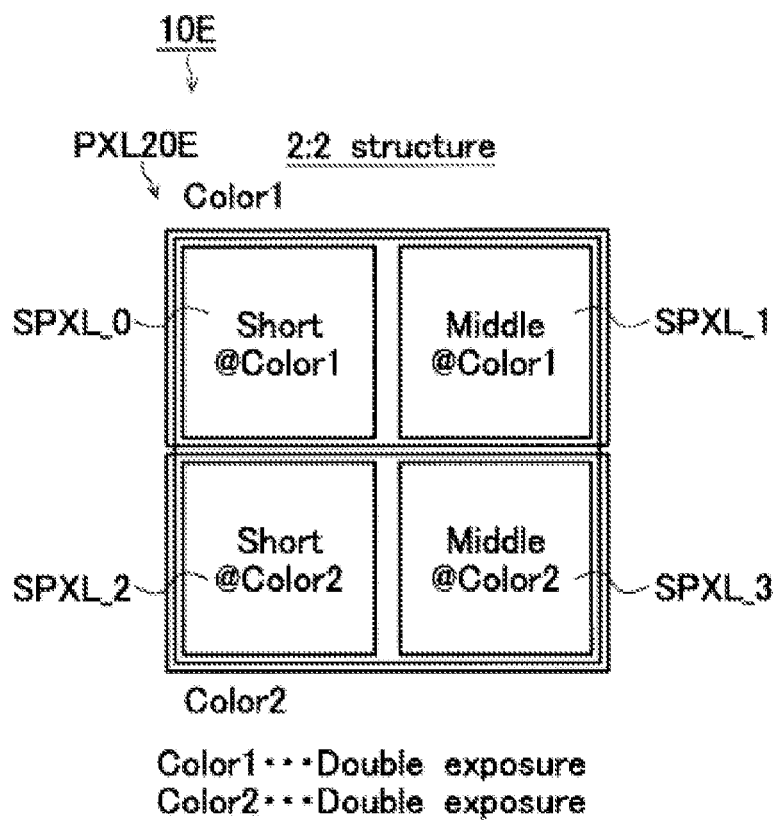
FIGS. 18A and 18B are used to illustrate colors, charge integration periods and other characteristics assigned to four sub-pixels of a single pixel of a solid-state imaging device relating to a sixth embodiment of the present invention.
Figure 18B:
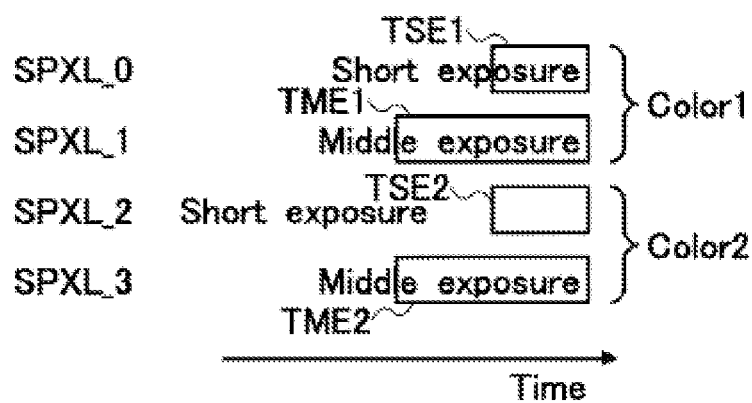

FIGS. 18A and 18B are used to illustrate colors, charge integration periods and other characteristics assigned to the four sub-pixels of a single pixel of a solid-state imaging device relating to a sixth embodiment of the present invention. FIG. 18A shows a 2:2 configuration employed by a solid-state imaging device 10E relating to the sixth embodiment, where four sub pixels SPXL_0, SPXL_1, SPXL_2, and SPXL_3 are provided, two of them or the sub-pixels SPXL_0 and SPXL_1 have the same color or the first color Color1, and the remaining two sub-pixels SPXL_2 and SPXL_3 have the second color Color2 (for example, R (red)). FIG. 18B schematically shows an example of a multiple exposure sequence for the 2:2 configuration.

According to the first to fourth embodiments, the pixels PXL20 to PXL20C all have a 4:0 configuration. More specifically, the pixels PXL20 to PXL20C are all divided into the plurality of, for example, the four sub-pixels SPXL_0, SPXL_1, SPXL_2 and SPXL_3 that have the same color or the first color (for example, G (green)) Color 1. The access control part 80 set different charge integration periods TE and different charge storage starting times STE between the photoelectric conversion parts PD of the sub-pixels SPXL. In other words, the access control part 80 sets different charge integration periods TE and different charge storage starting times STE, the number of which corresponds to the number of sub-pixels having the same color. Under these settings, the access control part 80 performs exposure control. The photodiodes of the sub-pixels sequentially start storing charges, starting from the photodiode of the sub-pixel with the longest charge integration period, and the charge integration period of the photodiode of any of the sub-pixels overlaps the charge integration period of the photodiode of the preceding sub-pixel.

In the sixth embodiment, on the other hand, the solid-state imaging device 10E has a 2:2 configuration, where the pixel PXL20E is divided into four sub pixels SPXL_0, SPXL_1, SPXL_2, and SPXL_3, two of them or the sub-pixels SPXL_0 and SPXL_1 have the same color or the first color Color1, and the remaining two sub-pixels SPXL_2 and SPXL_3 have the second color Color2 (for example, R (red)). The access control part 80 sets the charge integration periods TE and the charge storage starting times STE of the sub-pixels in the following manner. The charge integration periods TE1 and charge storage starting times STE1 of the two sub-pixels SPXL_0 and SPXL_1, the number of which corresponds to the number of sub-pixels having the same color, differ from each other, but the charge integration periods TE1 overlap each other, and the charge integration periods TE2 and charge storage starting times STE2 of the two sub-pixels SPXL_2 and SPXL_3, the number of which corresponds to the number of sub-pixels having the same color, differ from each other, but the charge integration periods TE2 overlap each other.

The access control part 80 assigns a short exposure period TSE1 and a middle exposure period TME1 to the two sub-pixels SPXL_0 and SPX_1 such that the respective exposure periods overlap each other. The access control part 80 assigns a short exposure period TLE2 and a middle exposure period TME2 to the two sub-pixels SPXL_2 and SPXL_3 such that the respective exposure periods overlap each other.

The sixth embodiment can produce the same effects as the above-described first to fourth embodiments.

Seventh Embodiment

Figure 19:
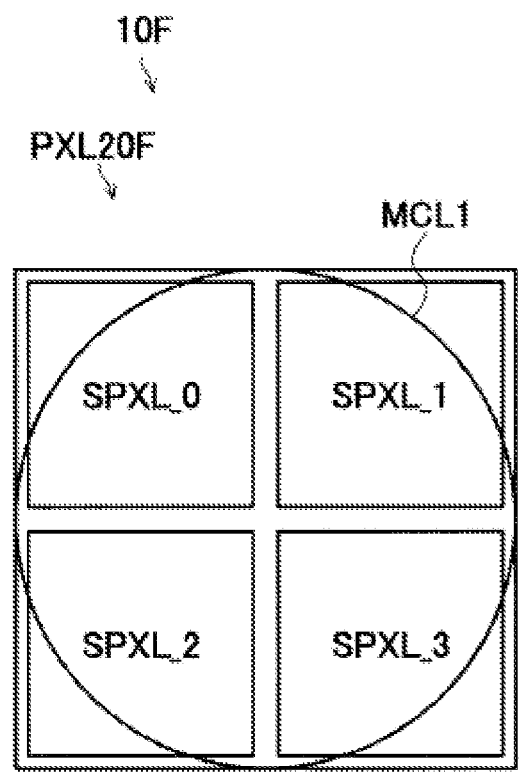
FIG. 19 shows an example configuration of a single pixel of a solid-state imaging device relating to a seventh embodiment of the present invention, where one microlens is provided for four sub-pixels.

FIG. 19 shows an example configuration of a single pixel of a solid-state imaging device relating to a seventh embodiment of the present invention, where one microlens is arranged for four sub-pixels.

A solid-state imaging device 10F relating to a seventh embodiment has pixels configured such that PDAF (Phase Detection Auto Focus) signal processing with a wide range, i.e., PDAF function with HDR can be realized.

In the present example, one microlens MCL1 is provided for the four sub-pixels SPXL_0, SPXL_1, SPXL_2, and SPXL_3 of the same color (for example, the first color), which make up a pixel PXL20E, as described in the first embodiment or the like. In this manner, the PDAF function is realized.

For example, a binning operation for the sub-pixels SPXL_0 and SPXL_1 and a binning operation for the sub-pixels SPXL_2 and SPXL_3 are performed concurrently and in parallel for reading. This enables 2-PD PDAF operation in the vertical direction. Alternatively, if a binning operation for the sub-pixels SPXL_0 and SPXL_2 and a binning operation for the sub-pixels SPXL_1 and SPXL_3 are performed concurrently and in parallel for reading. This enables 2-PD PDAF operation in the horizontal direction. In the same manner, a PDAF operation in the diagonal direction can be realized.

If a global shutter operation is performed with two or more memories, two PDAF signals can be held and read out simultaneously.

Eighth Embodiment

Figure 20:
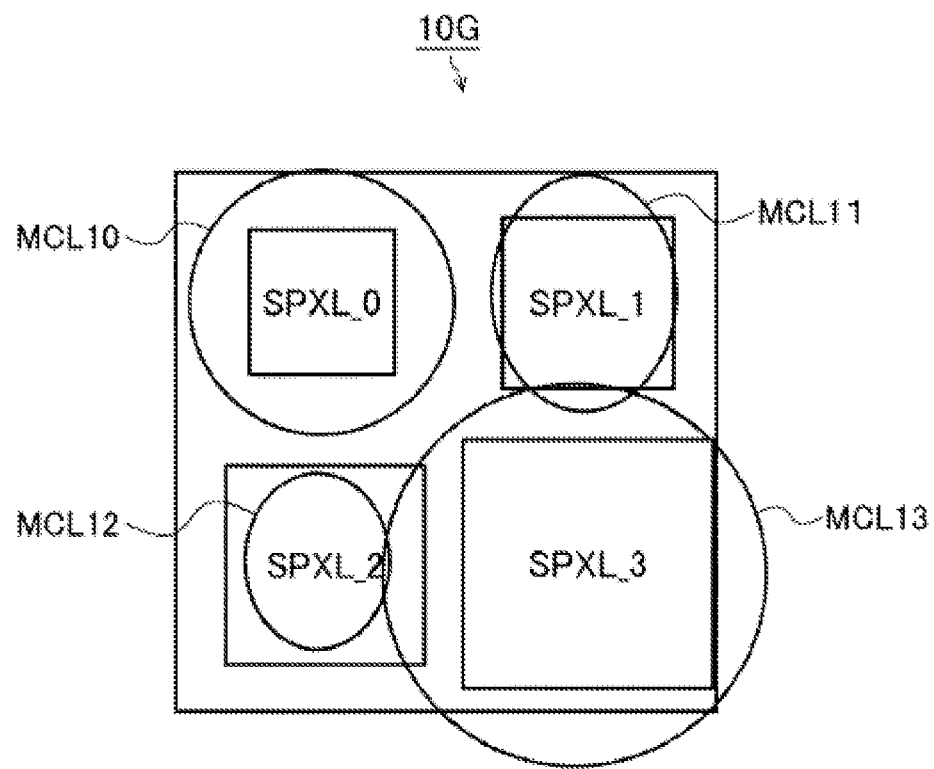
FIG. 20 shows an example configuration of a single pixel of a solid-state imaging device relating to an eighth embodiment of the present invention, where microlenses having different diameters are individually arranged for four sub-pixels.

FIG. 20 shows an example configuration of a single pixel of a solid-state imaging device relating to an eighth embodiment of the present invention, where microlenses having different diameters are individually arranged for four sub-pixels.

In a solid-state imaging device 10G relating to an eighth embodiment, four sub-pixels SPXL_0, SPXL_1, SPXL_2, and SPXL_3 have photodiodes PD of different sizes, so that the four sub-pixels SPXL_0, SPXL_1, SPXL_2, and SPXL_3 have different sensitivity levels. Microlenses MCL10, MCL11, MCL12 and MCL13 having different diameters are individually provided for the four sub-pixels SPXL_0, SPXL_1, SPXL_2 and SPXL_3. In the present example, the sub-pixel SPXL_0 has a low sensitivity level, the sub-pixel SPXL_1 has a middle sensitivity level, the sub-pixel SPXL_2 has a high sensitivity level, and the sub-pixel SPXL_3 has a very high sensitivity level.

According to the eighth embodiment, the signals produced by the four photodiodes PD having different sensitivity levels are read and combined. The solid-state imaging device 10G is thus capable of producing a high dynamic range (HDR) image. The signals can be also combined with the four signals output through the above-described multiple exposure operation.

The present invention can be also applied to solid-state imaging devices having digital pixel (pixel) sensors (DPS). In the digital pixel sensors, for example, each pixel may additionally have an ADC including a comparator (and additionally a memory part). In this way, the sensors can realize a global shutter according to which the exposure to light can start and end at the same timing in all of the pixels of the pixel array part. The DPS configuration makes it possible to select any of the pixels to be read, so that the above-described function can be realized.

Ninth Embodiment

Figure 21:
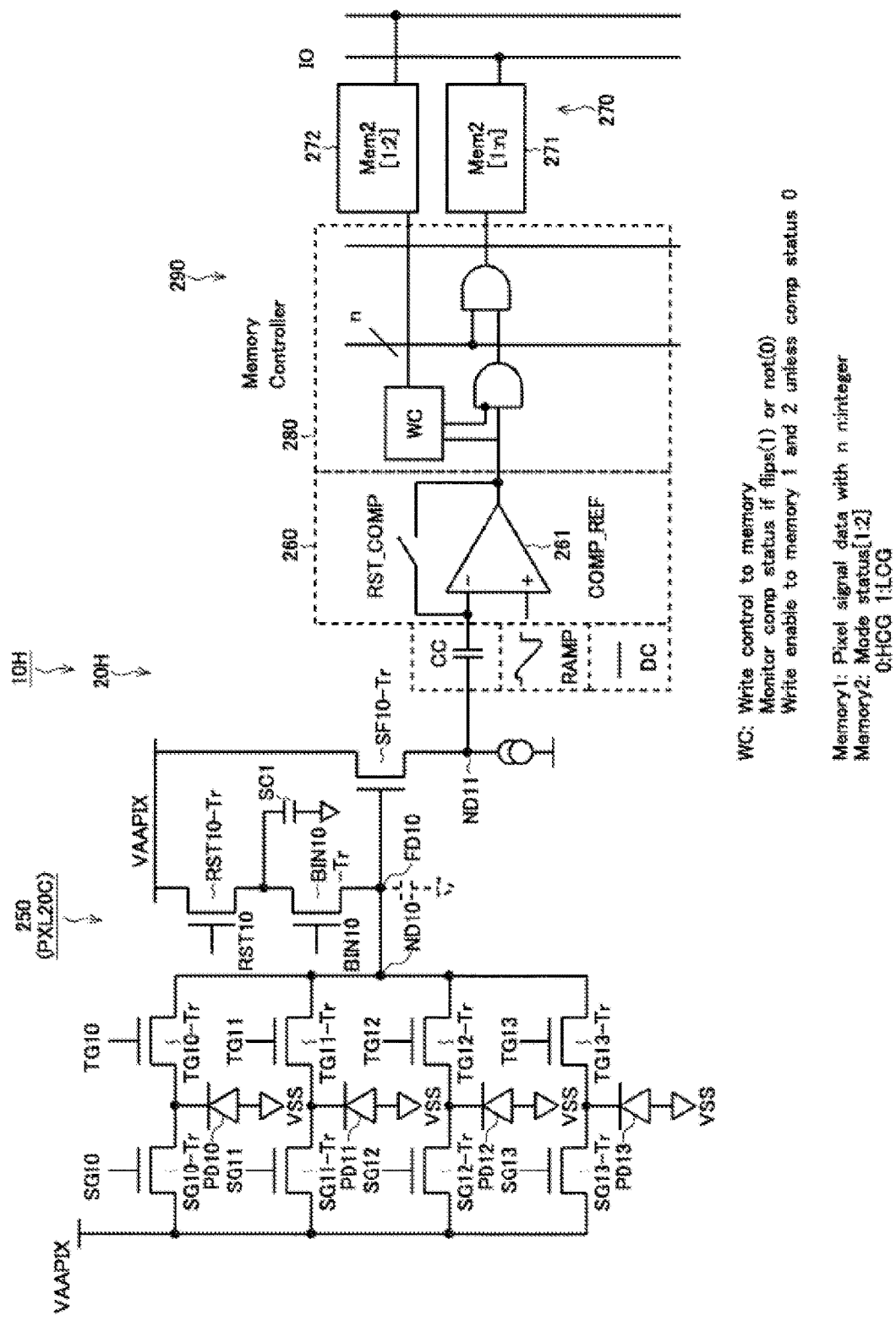
FIG. 21 shows an example configuration of a solid-state imaging device relating to a ninth embodiment of the present invention, which includes digital pixels and each digital pixel has a memory part and an ADC with a comparator so that global shutter can be also performed.

FIG. 21 shows a solid-state imaging device relating to a ninth embodiment of the present invention, or an example configuration of a solid-state imaging device including digital pixels, each digital pixel having an ADC with a comparator and also a memory part, so that global shutter according to which the exposure to light can start and end at the same timing in all of the pixels of the pixel array part can be also performed.

In a solid-state imaging device 10H relating to the ninth embodiment, a pixel part 20H includes digital pixels, and each digital pixel includes a photoelectric conversion reading part 250, an analog-to-digital (AD) converter 260, and a memory part 270. The solid-state imaging device 10H is configured, for example, as a stacked CMOS image sensor capable of operating in a global shutter mode. The AD converter 260, the memory part 270, and a memory control part 280 form a signal retaining part 290 for retaining read-out pixel signals. In the solid-state imaging device 10H relating to the ninth embodiment, each digital pixel DP is capable of performing AD conversion, and the AD converter 260 includes a comparator 261 for performing a comparing operation of comparing the voltage signal read out as a pixel signal by the photoelectric conversion reading part against a referential voltage and outputting a digital comparison result signal.

The solid-state imaging device 10H further includes the memory control part 280 for controlling access made to the memory part depending on the state (in the present embodiment, the level) of the comparison result signal from the comparator 261. The memory control part 280 then controls whether or not to allow writing of data corresponding to a second comparison result signal obtained as a result of a second comparing operation into the memory part 270, depending on the state of a first comparison result signal obtained as a result of a first comparing operation. More specifically, the memory control part 280 prohibits the writing of the data corresponding to the second comparison result signal obtained as a result of the second comparing operation into the memory part 270, if the level of the first comparison result signal obtained as a result of the first comparing operation changes from a first level to a second level in a first comparing operation period. On the other hand, the memory control part 280 allows the writing of the data corresponding to the second comparison result signal obtained as a result of the second comparing operation into the memory part 270, if the level of the first comparison result signal obtained as a result of the first comparing operation stays at and does not change from the first level in the first comparing operation period.

The memory control part 280 relating to the present embodiment can control whether or not to allow writing of the data corresponding to the third comparison result signal obtained as a result of the third comparing operation into the memory part 270, depending on the state of the first comparison result signal obtained as a result of the first comparing operation and the state of the second comparison result signal obtained as a result of the second comparing operation. More specifically, the memory control part 280 allows writing of data corresponding to a third comparison result signal obtained as a result of a third comparing operation into the memory part 270, if the level of the second comparison result signal obtained as a result of the second comparing operation stays at and does not change from the second level in a second comparing operation period.

The memory part 270 includes a first memory (Mem1) 271 and a second memory (Mem2) 272 as shown in FIG. 21.

The first memory 271 saves, under the control of the memory control part 280, the first comparison result signal SCMP1 and the second comparison result signal SCMP2 from the comparator 261 in the form of n-bit digital data.

The second memory 272 saves, under the control of the memory control part 280, status information indicative of the operational mode. The second memory 272 saves, for example, status information of "0" for the HCG mode (the PD-ADC mode) and status information "1" for the LCG mode (the FD-ADC mode).

The solid-state imaging device 10H relating to the ninth embodiment is capable of selecting, for each pixel, one of the pixel signals produced by multiple exposure or read from a plurality of sub-pixels in a single integration period and holding, in the memory part 270, the selected pixel signal satisfying a predetermined condition and corresponding sub-pixel information. The solid-state imaging device 10H is also capable of reproducing an optical signal based on the held signal satisfying the predetermined condition and the corresponding sub-pixel information.

In an example case where a pixel has a plurality of photoelectric conversion parts of high and low sensitivity levels, if the high sensitivity level is equal to or less than a predetermined level, the corresponding data is held and data writing is prohibited, and the status is also written into the memory part 270. If the high sensitivity level is higher than the predetermined level, the memory is released, and the data provided by the low-sensitivity pixel is written. The solid-state imaging device 10H also reads out the written status information, and causes an external circuit to perform correction on the sensitivity based on sensitivity ratio data measured in advance, thereby performing linearization correction.

The solid-state imaging device 10H relating to the ninth embodiment is applicable to devices capable of holding charges in a digital form, and such devices can achieve reduced power consumption and a reduced pixel size. Additionally, the ninth embodiment is capable of substantially achieving a widened dynamic range and a raised frame rate, allowing efficient access to memory, achieving reduced noise, and maximizing the effective pixel region and value per cost. Additionally, the solid-state imaging device 10H relating to the ninth embodiment can prevent the increase in the configuration complexity and the reduction in area efficiency from the perspective of layout.

According to the ninth embodiment, subtraction can be performed between signals produced by photodiodes PD with different exposure durations or between signals produced by photodiodes PD having different sensitivity levels, so that a difference can be extracted within a single sub-pixel.

The following outlines a reading operation performed by accessing the four sub-pixels SPXL_0 to SPXL_3 when the signal retaining part 290 has a global shutter. The global shutter can be, for example, a voltage holding global shutter realized by sample (S)/hold (H) capacitors twice as many as the sub-pixels or a digital pixel global shutter realized by an analog-digital (AD) converting part and the same number of digital memories as the sub-pixels.

(Reading Operation when Global Shutter is Voltage Holding Global Shutter)

In this case, the signal retaining part 290 has samples (S)/Hold (H) capacitors twice as many as the sub-pixels SPXL, which provides for a voltage holding global shutter function. In a global shutter mode, when the first sub-pixel SPXL_0, the second sub-pixel SPXL_1, the third sub-pixel SPXL_2, and the fourth sub-pixel SPXL_3 are sequentially accessed, a reading operation is performed in the following manner under the control of the access control part 280.

In the first sub-pixel SPXL_0, an exposure period starts. After that, the first reset transistor RST10-Tr remains in the conduction state for a predetermined period of time to reset the floating diffusion FD10. Following this, a first reset read-out operation is performed in a first reset read-out period to read a first reset read-out signal. The first reset read-out period is followed by a first transfer period and then a first signal read-out period. In the first signal read-out period, a first signal read-out operation is performed to read a first read-out signal.

Following this, in the second sub-pixel SPXL_1, the second reset transistor RST10-Tr is switched to and remains in the conduction state for a predetermined period of time to reset the floating diffusion FD10. After this, in a second reset read-out period, a second reset read-out operation is performed to read a second reset read-out signal. The second reset read-out period is followed by a second transfer period and then a second signal read-out period. In the second signal read-out period, a second signal read-out operation is performed to read a second read-out signal.

Following this, in the third sub-pixel SPXL_2, the third reset transistor RST10-Tr is switched to and remains in the conduction state for a predetermined period of time to reset the floating diffusion FD10. After this, a third reset read-out operation is performed in a third reset read-out period to read a third reset read-out signal. The third reset read-out period is followed by a third transfer period and then a third signal read-out period. In the third signal read-out period, a third signal read-out operation is performed to read a third read-out signal.

Following this, in the fourth sub-pixel SPXL_3, the fourth reset transistor RST10-Tr is switched to and remains in the conduction state for a predetermined period of time to reset the floating diffusion FD10. After this, a fourth reset read-out operation is performed in a fourth reset read-out period to read a fourth reset read-out signal. The fourth reset read-out period is followed by a fourth transfer period and then a fourth signal read-out period. In the fourth signal read-out period, a fourth signal read-out operation is performed to read a fourth read-out signal.

In the signal retaining part 290, the respective signals read from the first sub-pixel SPXL_0, the second sub-pixel SPXL_1, the third sub-pixel SPXL_2, and the fourth sub-pixel SPXL_3 are retained in the corresponding S/H capacitors and subsequently read on a row-by-row basis in a column parallel processing scheme.

(Reading Operation when Global Shutter is Digital Pixel Global Shutter)

In this case, the signal retaining part 290 includes an analog-to-digital (AD) converter 260 with a reset function for comparing the read-out signal voltage read from the sub-pixels SPXL with a reference voltage and using the result of the comparison as a read-out result, and digital memories as many as the sub-pixels, which provides for a digital pixel global shutter. In a global shutter mode, when the first sub-pixel SPXL_0, the second sub-pixel SPXL_1, the third sub-pixel SPXL_2, and the fourth sub-pixel SPXL_3 are sequentially accessed, a reading operation is performed in the following manner under the control of the access control part 280.

In the first sub-pixel SPXL_0, the exposure period starts. After that, the first reset transistor RST10-Tr remains in the conduction state for a predetermined period of time to reset the floating diffusion FD10. Following this, a first reset read-out signal is held at a predetermined reset level in a first reset read-out period by establishing a short circuit between the input and output of the AD converter 260. The first reset read-out period is followed by a first transfer period and then a first signal read-out period. In the first signal read-out period, a first signal read-out operation is performed to read a first read-out signal through the ADC operation by the AD converter 260.

Subsequently, in the second sub-pixel SPXL_1, the second reset transistor RST10-Tr remains in the conduction state for a predetermined period of time to reset the floating diffusion FD10. Following this, a second reset read-out signal is held at a predetermined reset level in a second reset read-out period by establishing a short circuit between the input and output of the AD converter 260. The second reset read-out period is followed by a second transfer period and then a second signal read-out period. In the second signal read-out period, a second signal read-out operation is performed to read a second read-out signal through the ADC operation by the AD converter 260.

Subsequently, in the third sub-pixel SPXL_2, the third reset transistor RST10-Tr remains in the conduction state for a predetermined period of time to reset the floating diffusion FD10. Following this, a third reset read-out signal is held at a predetermined reset level in a third reset read-out period by establishing a short circuit between the input and output of the AD converter 260. The third reset read-out period is followed by a third transfer period and then a third signal read-out period. In the third signal read-out period, a third signal read-out operation is performed to read a third read-out signal through the ADC operation by the AD converter 260.

Subsequently, in the fourth sub-pixel SPXL_3, the fourth reset transistor RST10-Tr remains in the conduction state for a predetermined period of time to reset the floating diffusion FD10. Following this, a fourth reset read-out signal is held at a predetermined reset level in a fourth reset read-out period by establishing a short circuit between the input and output of the AD converter 260. The fourth reset read-out period is followed by a fourth transfer period and then a fourth signal read-out period. In the fourth signal read-out period, a fourth signal read-out operation is performed to read a fourth read-out signal through the ADC operation by the AD converter 260.

In the signal retaining part 290, the respective signals read from the first sub-pixel SPXL_0, the second sub-pixel SPXL_1, the third sub-pixel SPXL_2, and the fourth sub-pixel SPXL_3 and converted by the AD converter 260 are retained in the corresponding digital memories and subsequently read on a row-by-row basis in a column parallel processing scheme.

The solid-state imaging devices 10, 10A to 10H described above can be applied, as an imaging device, to electronic apparatuses such as digital cameras, video cameras, mobile terminals, surveillance cameras, and medical endoscope cameras.

Figure 22:
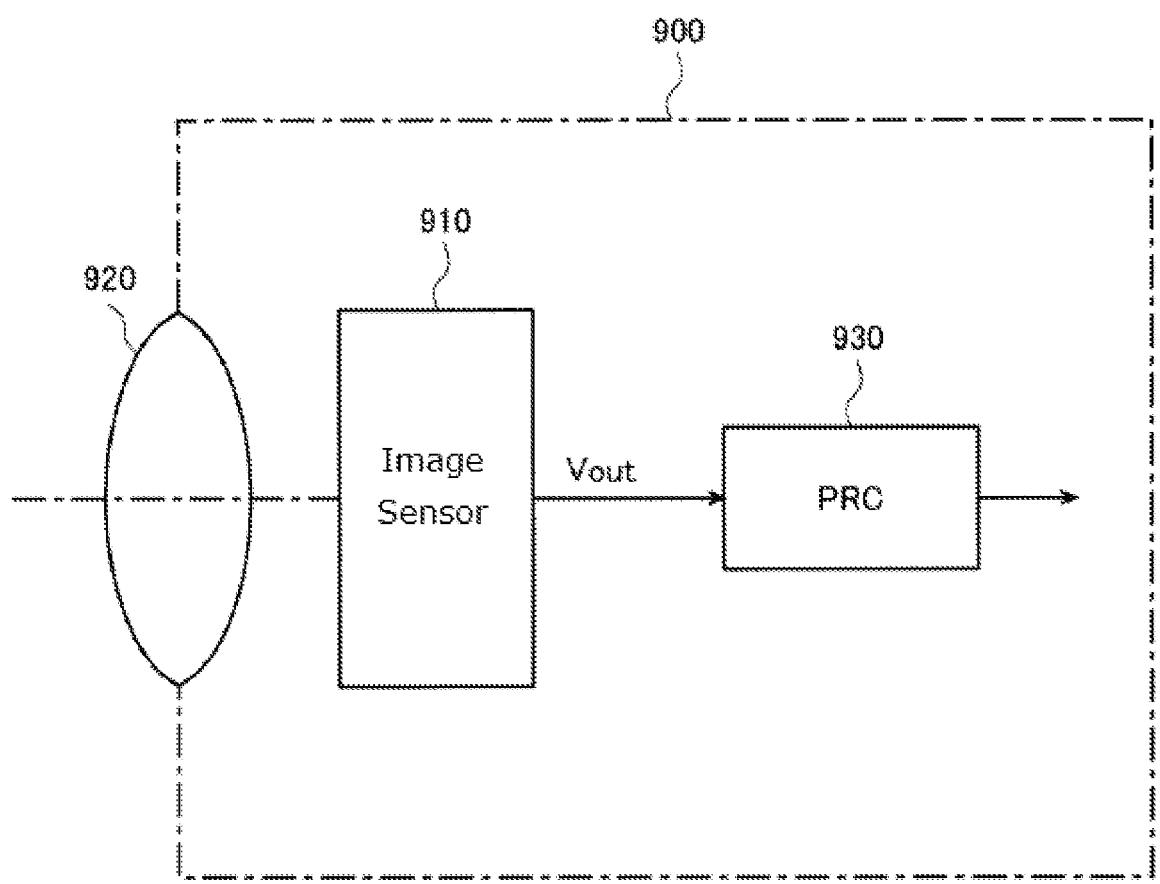
FIG. 22 shows an example configuration of an electronic apparatus to which the solid-state imaging devices relating to the embodiments of the present invention can be applied.

FIG. 22 shows an example of the configuration of an electronic apparatus including a camera system to which the solid-state imaging devices relating to the embodiments of the present invention are applied.

As shown in FIG. 22, the electronic apparatus 900 includes a CMOS image sensor 910 that can be constituted by any of the solid-state imaging devices 10 and 10A to 10H relating to the embodiments of the present invention. The electronic apparatus 900 further includes an optical system (such as a lens) 920 for redirecting the incident light to the pixel region of the CMOS image sensor 910 (to form a subject image). The electronic apparatus 900 includes a signal processing circuit (PRC) 930 for processing the output signals from the CMOS image sensor 910.

The signal processing circuit 930 performs predetermined signal processing on the output signals from the CMOS image sensor 910. The image signals resulting from the processing in the signal processing circuit 930 can be handled in various manners. For example, the image signals can be displayed as a video image on a monitor having a liquid crystal display, printed by a printer, or recorded directly on a storage medium such as a memory card.

As described above, if any of the above-described solid-state imaging devices 10 and 10A to 10H is mounted as the CMOS image sensor 910, the camera system can achieve high-performance, compactness, and low-cost. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
a pixel part having pixels arranged therein, each pixel being divided into a plurality of sub-pixels including sub-pixels of a same color, each pixel including a photoelectric conversion part for performing photoelectric conversion; and
an access control part individually controls accesses to the plurality of sub-pixels of the each pixel,
wherein the access control part:
sets different charge integration periods and different charge storage starting times between the photoelectric conversion parts of the plurality of sub-pixels; and
performs exposure control such that the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

2. The solid-state imaging device of claim 1, wherein, when three or more charge integration periods are set, the access control part controls all of the three or more charge integration periods to overlap each other.

3. The solid-state imaging device of claim 1, wherein the access control part performs the exposure control such that the charge integration periods of the sub-pixels of the same color all end before an end of the longest charge integration period.

4. The solid-state imaging device of claim 1, wherein the access control part performs the exposure control such that the charge integration periods of the sub-pixels of the same color end concurrently.

5. The solid-state imaging device of claim 1, wherein, while performing a long exposure period, the access control part repeatedly performs a short exposure period.

6. The solid-state imaging device of claim 1,
wherein the plurality of sub-pixels forming the each pixel all have a same color, and
wherein the access control part sets a plurality of charge integration periods having different durations the number of which corresponds to the number of sub-pixels forming the each pixel.

7. The solid-state imaging device of claim 1, wherein, when the plurality of sub-pixels forming the each pixel include sub-pixels of different colors, the access control part performs the exposure control for the different colors in parallel.

8. The solid-state imaging device of claim 7,
wherein the plurality of sub-pixels forming the each pixel have a plurality of different colors and include more than one sub-pixel for each color, and
wherein the access control part sets, for each color, a plurality of charge integration periods with different durations the number of which corresponds to the number of sub-pixels having the each color.

9. The solid-state imaging device of claim 7,
wherein the plurality of sub-pixels forming the each pixel include one sub-pixel having a predetermined color, and
wherein the access control part:
sets a single charge integration period for the sub-pixel having the predetermined color; and
sets, for one or more sub-pixels having a different color than the predetermined color, a plurality of charge integration periods having different durations the number of which corresponds to the number of sub-pixels having the different color.

10. The solid-state imaging device of claim 1, wherein the photoelectric conversion parts of the plurality of sub-pixels forming the each pixel share a single microlens.

11. The solid-state imaging device of claim 1,
wherein the each pixel further has:
at least two photoelectric conversion parts for storing therein, in a charge integration period, charges generated by photoelectric conversion;
a plurality of transfer elements for individually transferring, in a transfer period following the storing period, the charges stored in the photoelectric conversion parts;
a floating diffusion serving as an output node to which the charges stored in each of the photoelectric conversion parts are transferred through a corresponding one of the plurality of transfer elements;
a reset element for resetting, in a reset period, the floating diffusion to a predetermined potential; and
a source follower element serving as an output buffer part for converting charges in the floating diffusion into a voltage signal at a level determined by an amount of the charges and outputting the voltage signal,
wherein the each sub-pixel includes the photoelectric conversion part and one of the plurality of transfer elements connected thereto, and
wherein one floating diffusion and one source follower element are shared between the photoelectric conversion parts and between the plurality of transfer elements.

12. The solid-state imaging device of claim 11, wherein the each pixel has a plurality of shutter gates connected respectively to the photoelectric conversion parts, and each of the plurality of shutter gates is configured to allow charges to overflow from a corresponding one of the photoelectric conversion parts connected thereto to a region other than a region of the floating diffusion, to operate as an electronic shutter for releasing the charges in the corresponding one of the photoelectric conversion parts.

13. The solid-state imaging device of claim 12, wherein the access control part performs the exposure control such that:
the plurality of shutter gates of the plurality of sub-pixels are sequentially placed in a conduction state for a predetermined period of time, starting from a shutter gate of a sub-pixel having a longest charge integration period, to reset the photoelectric conversion parts, and charge integration periods of the photoelectric conversion parts of the plurality of sub-pixels then sequentially start; and
the plurality of transfer elements of the plurality of sub-pixels are sequentially placed in a conduction state for a predetermined period of time, starting from a transfer element of a sub-pixel having a shortest charge integration period, so that the charge integration periods of the photoelectric conversion parts of the plurality of sub-pixels sequentially end and transfer periods sequentially start for transferring the charges stored in the photoelectric conversion parts.

14. The solid-state imaging device of claim 13, wherein the access control part performs the exposure control such that a given one of the plurality of sub-pixels that has a short charge integration period repeatedly performs a series of operations until a long charge integration period ends, and the series of operations includes:
placing the transfer element of the given sub-pixel in a conduction state for a predetermined period of time, to end the charge integration period of the photoelectric conversion part of the given sub-pixel;
subsequently placing the shutter gate of the given sub-pixel in a conduction state for a predetermined period of time, to reset the photoelectric conversion part, and starting the charge integration period of the photoelectric conversion part of the given sub-pixel again; and
placing the transfer element of the given sub-pixel in a conduction state for a predetermined period of time, to end the charge integration period of the photoelectric conversion part of the given sub-pixel.

15. The solid-state imaging device of claim 1,
wherein the each pixel has:
at least two photoelectric conversion parts for storing therein, in a charge integration period, charges generated by photoelectric conversion;
a plurality of transfer elements for individually transferring, in a transfer period following the storing period, the charges stored in the photoelectric conversion parts;
a floating diffusion serving as an output node to which the charges stored in each of the photoelectric conversion parts are transferred through a corresponding one of the plurality of transfer elements;
a reset element for resetting, in a reset period, the floating diffusion to a predetermined potential; and
a storage element connected to the floating diffusion;
a storage capacitance element for storing the charges received from the floating diffusion via the storage element; and
a source follower element serving as an output buffer part for converting the charges in the floating diffusion into a voltage signal at a level determined by an amount of the charges and outputting the voltage signal,
wherein the each sub-pixel includes the photoelectric conversion part and one of the plurality of transfer elements connected thereto,
wherein the storage element is arranged between the floating diffusion and the reset element,
wherein the each pixel is configured to change a capacitance of the floating diffusion serving as an output node between a first capacitance and a second capacitance, so that a conversion gain is changeable between a first conversion gain corresponding to the first capacitance and a second conversion gain corresponding to the second capacitance,
wherein the each pixel is configured to perform, under control of the access control part, dual-conversion-gain reading according to which the first conversion gain and the second conversion gain are respectively applied in two reading operations on a same sub-pixel,
wherein, when reading is performed on a first sub-pixel and then on a second sub-pixel in a dual-conversion-gain reading mode,
in the first sub-pixel,
the storage element is switched to a conduction state to change a gain of the floating diffusion to the second conversion gain, so that a second-conversion-gain reset read-out operation is performed,
the storage element is switched to a non-conduction state to change the gain of the floating diffusion to the first conversion gain, so that a first-conversion-gain reset read-out operation is performed,
the storage element remains in a non-conduction state to keep the gain of the floating diffusion at the first conversion gain, so that a transfer operation is performed in a first transfer period and a first-conversion-gain signal read-out operation is subsequently performed, and
the storage element is switched to a conduction state to change the gain of the floating diffusion to the second conversion gain, so that a transfer operation is performed in a second transfer period and a second-conversion-gain signal read-out operation is subsequently performed, and
subsequently in the second sub-pixel,
the storage element is switched to a conduction state to change a gain of the floating diffusion to the second conversion gain, so that a second-conversion-gain reset read-out operation is performed,
the storage element is switched to a non-conduction state to change the gain of the floating diffusion to the first conversion gain, so that a first-conversion-gain reset read-out operation is performed,
the storage element remains in a non-conduction state to keep the gain of the floating diffusion at the first conversion gain, so that a transfer operation is performed in a third transfer period and a first-conversion-gain signal read-out operation is subsequently performed, and
the storage element is switched to a conduction state to change the gain of the floating diffusion to the second conversion gain, so that a transfer operation is performed in a fourth transfer period and a second-conversion-gain signal read-out operation is subsequently performed.

16. The solid-state imaging device of claim 1, wherein the each pixel has a signal retaining part including a memory part for retaining read-out signals from the plurality of sub-pixels, the signal retaining part being configured to provide for a global shutter controlling exposure to start and end at a same timing in all of the pixels in the pixel part.

17. The solid-state imaging device of claim 16,
   wherein the each pixel at least includes:
   at least two photoelectric conversion parts for storing therein, in a charge integration period, charges generated by photoelectric conversion;
   a plurality of transfer elements for individually transferring, in a transfer period following the storing period, the charges stored in the photoelectric conversion parts;
   a floating diffusion serving as an output node to which the charges stored in each of the photoelectric conversion parts are transferred through a corresponding one of the transfer elements;
   a reset element for resetting, in a reset period, the floating diffusion to a predetermined potential; and
   a storage element connected to the floating diffusion;
   a storage capacitance element for storing the charges received from the floating diffusion via the storage element; and
   a source follower element serving as an output buffer part for converting charges in the floating diffusion into a voltage signal at a level determined by an amount of the charges and outputting the voltage signal,
   wherein the each sub-pixel includes the photoelectric conversion part and one of the plurality of transfer elements connected thereto,
   wherein the signal retaining part includes sample (S)/hold (H) capacitors twice as many as the plurality of sub-pixels forming the each pixel to provide for a voltage-holding global shutter, and
   wherein, when a first sub-pixel, a second sub-pixel, a third sub-pixel, and a fourth sub-pixel are sequentially accessed in a global shutter mode,
      under control of the access control part, in the first sub-pixel,
      an exposure period starts, a first reset element then remains in a conduction state for a predetermined period of time to reset the floating diffusion, and a first reset read-out operation is subsequently performed in a first reset read-out period to read a first reset read-out signal,
      the first reset read-out period is followed by a first transfer period and then a first signal read-out period, and in the first signal read-out period, a first signal read-out operation is performed to read a first read-out signal,
      subsequently in the second sub-pixel,
      a second reset element remains in a conduction state for a predetermined period of time to reset the floating diffusion, and a second reset read-out operation is subsequently performed in a second reset read-out period to read a second reset read-out signal,
      the second reset read-out period is followed by a second transfer period and then a second signal read-out period, and in the second signal read-out period, a second signal read-out operation is performed to read a second read-out signal,
      subsequently in the third sub-pixel,
      a third reset element remains in a conduction state for a predetermined period of time to reset the floating diffusion, and a third reset read-out operation is subsequently performed in a third reset read-out period to read a third reset read-out signal,
      the third reset read-out period is followed by a third transfer period and then a third signal read-out period, and in the third signal read-out period, a third signal reading operation is performed to read a third read-out signal, and
      subsequently in the fourth sub-pixel,
      a fourth reset element remains in the conduction state for a predetermined period of time to reset the floating diffusion, and a fourth reset read-out operation is subsequently performed in a fourth reset read-out period to read a fourth reset read-out signal, and
      the fourth reset read-out period is followed by a fourth transfer period and then a fourth signal read-out period, and in the fourth signal read-out period, a fourth signal read-out operation is performed to read a fourth read-out signal, and in the signal retaining part,
      respective signals read from the first sub-pixel, the second sub-pixel, the third sub-pixel, and the fourth sub-pixel are retained in the S/H capacitors and subsequently read on a row-by-row basis in a column parallel processing scheme.

18. The solid-state imaging device of claim 16,
   wherein the each pixel at least includes:
   at least two photoelectric conversion parts for storing therein, in a charge integration period, charges generated by photoelectric conversion;
   a plurality of transfer elements for individually transferring, in a transfer period following the storing period, the charges stored in the photoelectric conversion parts;
   a floating diffusion serving as an output node to which the charges stored in each of the photoelectric conversion parts are transferred through a corresponding one of the plurality of transfer elements;
   a reset element for resetting, in a reset period, the floating diffusion to a predetermined potential; and
   a storage element connected to the floating diffusion;
   a storage capacitance element for storing the charges received from the floating diffusion via the storage element; and
   a source follower element serving as an output buffer part for converting the charges in the floating diffusion into a voltage signal at a level determined by an amount of the charges and outputting the voltage signal,
   wherein the each sub-pixel includes the photoelectric conversion part and one of the plurality of transfer elements connected thereto,
   wherein the signal retaining part includes:
      an analog-to-digital (AD) converter with a reset function for comparing, against a reference voltage, read-out signal voltages read from the plurality of sub-pixels forming the each pixel and using a result of the comparison as a read-out result; and
      digital memories as many as the plurality of sub-pixels forming the each pixel,
   wherein the signal retaining part has a digital-pixel global shutter,
   wherein, when a first sub-pixel, a second sub-pixel, a third sub-pixel, and a fourth sub-pixel are sequentially accessed in a global shutter mode,
      under control of the access control part, in the first sub-pixel, an exposure period starts, a first reset element then remains in a conduction state for a predetermined period of time to reset the floating diffusion, and a first reset read-out signal is subsequently held at a predetermined reset level in a first reset read-out period by establishing a short circuit between an input and an output of the AD converter, the first reset read-out period is followed by a first transfer period and then a first signal read-out period, and in the first signal read-out period, a first signal read-out operation is performed by the AD converter to read a first read-out signal, subsequently in the second sub-pixel, a second reset element remains in a conduction state for a predetermined period of time to reset the floating diffusion, and a second reset read-out signal is then held at a predetermined reset level in a second reset read-out period by establishing a short circuit between an input and an output of the AD converter, the second reset read-out period is followed by a second transfer period and then a second signal read-out period, and in the second signal read-out period, a second signal read-out operation is performed by the AD converter to read a second read-out signal, subsequently in the third sub-pixel, a third reset element remains in a conduction state for a predetermined period of time to reset the floating diffusion, and a third reset read-out signal is then held at a predetermined reset level in a third reset read-out period by establishing a short circuit between an input and an output of the AD converter, the third reset read-out period is followed by a third transfer period and then a third signal read-out period, and in the third signal read-out period, a third signal read-out operation is performed by the AD converter to read a third read-out signal, and subsequently in the fourth sub-pixel, a fourth reset element remains in a conduction state for a predetermined period of time to reset the floating diffusion, and a fourth reset read-out signal is then held at a predetermined reset level in a fourth reset read-out period by establishing a short circuit between an input and an output of the AD converter, the fourth reset read-out period is followed by a fourth transfer period and then a fourth signal read-out period, and in the fourth signal read-out period, a fourth signal read-out operation is performed by the AD converter to read a fourth read-out signal, and wherein, in the signal retaining part, respective signals read by the AD converter from the first sub-pixel, the second sub-pixel, the third sub-pixel, and the fourth sub-pixel are correspondingly held in the digital memories, and subsequently read on a row-by-row basis in a column parallel processing scheme.

19. A method for driving a solid-state imaging device, the solid-state imaging device including:

a pixel part having pixels arranged therein, each pixel being divided into a plurality of sub-pixels including sub-pixels of a same color, each pixel including a photoelectric conversion part for performing photoelectric conversion, the solid-state imaging device being configured to individually control accesses to the plurality of sub-pixels of the each pixel, wherein different charge integration periods and different charge storage starting times are set between the photoelectric conversion parts of the plurality of sub-pixels; and the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

20. An electronic apparatus comprising:

a solid-state imaging device; and an optical system for forming a subject image on the solid-state imaging device, wherein the solid-state imaging device includes:

a pixel part having pixels arranged therein, each pixel being divided into a plurality of sub-pixels including sub-pixels of a same color, each pixel including a photoelectric conversion part for performing photoelectric conversion; and an access control part individually controls accesses to the plurality of sub-pixels of the each pixel, wherein the access control part:

sets different charge integration periods and different charge storage starting times between the photoelectric conversion parts of the plurality of sub-pixels; and performs exposure control such that the photoelectric conversion parts of the plurality of sub-pixels sequentially start storing charges, starting from the photoelectric conversion part of the sub-pixel with a longest charge integration period, and a charge integration period of the photoelectric conversion part of any of the plurality of sub-pixels overlaps a charge integration period of the photoelectric conversion part of a preceding sub-pixel.

* * * * *